US011714950B2

(12) United States Patent
Singh et al.

(10) Patent No.: US 11,714,950 B2
(45) Date of Patent: Aug. 1, 2023

(54) AUTOMATED TIMING CLOSURE ON CIRCUIT DESIGNS

(71) Applicant: Xilinx, Inc., San Jose, CA (US)

(72) Inventors: Veeresh Pratap Singh, Hyderabad (IN); Meghraj Kalase, Hyderabad (IN); John Blaine, Weybridge (GB); Srinivasan Dasasathyan, Secunderabad (IN); Padmini Gopalakrishnan, Hyderabad (IN); Frederic Revenu, San Carlos, CA (US); Veena Johar, Hyderabad (IN); Pawan Kumar Singh, Lucknow (IN); Mohit Sharma, Jaipur (IN); Kameshwar Chandrasekar, Hyderabad (IN)

(73) Assignee: XILINX, INC., San Jose, CA (US)

( * ) Notice: Subject to any disclaimer, the term of this patent is extended or adjusted under 35 U.S.C. 154(b) by 133 days.

(21) Appl. No.: 17/382,621

(22) Filed: Jul. 22, 2021

(65) Prior Publication Data

US 2023/0034736 A1    Feb. 2, 2023

(51) Int. Cl.
*G06F 30/392* (2020.01)
*G06F 30/398* (2020.01)
(Continued)

(52) U.S. Cl.
CPC ............ *G06F 30/398* (2020.01); *G06F 30/31* (2020.01); *G06F 30/327* (2020.01); *G06F 30/392* (2020.01)

(58) Field of Classification Search
CPC .. G06F 2119/12; G06F 30/392; G06F 30/398; G06F 30/327; G06F 30/39; G06F 30/3312; G06F 30/367; G06F 2119/06; G06F 30/394; G06F 30/30; G06F 30/396; G06F 30/333; G06F 2111/04; G06F 30/3323; G06F 30/33; G06F 30/34; G06F 30/3315; G06F 30/337; G06F 2115/06; G06F 30/00; G06F 30/27; G06F 2111/08; G06F 30/20; G06F 30/32; G06F 30/3953;
(Continued)

(56) References Cited

U.S. PATENT DOCUMENTS 10,318,691 B2 *  6/2019  Sarrazin ............ G06F 30/3312
10,366,201 B1 *  7/2019  Ng .................... G06F 30/327
(Continued)

*Primary Examiner* — Binh C Tat
(74) *Attorney, Agent, or Firm* — Crawford Maunu PLLC

(57) ABSTRACT

Processing a circuit design includes stabilizing the circuit design by a design tool that performs one or more iterations of implementation, optimization assessment, optimization, and stability assessment until a threshold stability level is achieved. The design tool determines, in response to satisfaction of the threshold stability level, different strategies based on features of the circuit design and likelihood that use of the strategies would improve timing. Each strategy includes parameter settings for the design tool. The design tool executes multiple implementation flows using different sets of strategies to generate alternative implementations. One implementation of the alternative implementations nearest to satisfying a timing requirement is selected. The selected implementation is iteratively optimized to satisfy the timing requirement, while restricting changes to placement of cells and nets on a critical path of the one implementation to less than a threshold portion of cells and nets on the critical path.

20 Claims, 12 Drawing Sheets

(51) Int. Cl.
*G06F 30/327* (2020.01)
*G06F 30/31* (2020.01)

(58) Field of Classification Search
CPC .............. G06F 2111/06; G06F 2119/02; G06F 2119/18; G06F 30/31; G06F 30/3308; G06F 30/3947; G06F 1/10; G06F 18/213; G06F 18/214; G06F 21/75; G06F 2111/20; G06F 2115/02; G06F 2117/10; G06F 30/35; G06F 30/373; G06F 9/3869; G06F 1/08; G06F 1/3234; G06F 1/3237; G06F 2111/14; G06F 2113/18; G06F 30/10; G06F 30/323; H01L 2225/06544; H01L 27/0207; H01L 21/67144; H01L 25/0657; H01L 29/1033; H01L 2221/68381; H01L 2225/06541; H01L 25/18; H01L 25/50
USPC .................................................. 716/100–106
See application file for complete search history.

(56) References Cited

U.S. PATENT DOCUMENTS

| | | |
|---|---|---|
| 10,867,093 B1 | 12/2020 | Blaine et al. |
| 11,003,826 B1 | 5/2021 | Dasasathyan et al. |
| 2013/0239078 A1* | 9/2013 | Chu .................... G06F 30/3312 716/113 |
| 2017/0371993 A1* | 12/2017 | Sarrazin .................. G06F 30/35 |

* cited by examiner

| Suggestions | Descriptions | Next Steps | Explanation |
|---|---|---|---|
| CLOCK-5 | Rebalance source and destination clock paths | Fix the design to balance source and destination clock path delays | The source and destination clock path delays are unbalanced resulting in high clock skew. |
| CLOCK-12 | Register to BUFGCE paths | run "source RQSImplCommon.tcl" | Paths from register to BUFGCE have high clock skew |

1502 Sort violations of design checks by severity level

↓

1504 For each violation object of a base check having a severity level greater than a threshold, determine the violation objects having dependent checks of the base check

↓

1506 Output in order of descending levels of severity of base checks, the suggested actions associated with the base checks and dependent checks

↓

1508 Execute automated procedure in response to selection of suggested action

FIG. 9

AUTOMATED TIMING CLOSURE ON CIRCUIT DESIGNS

TECHNICAL FIELD

The disclosure generally relates to achieving timing closure on circuit designs.

BACKGROUND

Timing closure is one example of an important objective for Electronic Design Automation (EDA) tools in processing circuit designs targeted to application specific integrated circuit (ASICs), system on chips (SoCs), or field programmable gate arrays (FPGAs). Other examples of objectives include satisfying constraints relating to circuit area and power consumption.

In EDA tools, the behavior of the algorithms used for optimizing designs is highly non-linear and usually difficult to predict. The algorithms also involve objective functions and are usually heuristic in nature. A typical EDA tool consists of many such optimization algorithms working in sequence, which is sometimes referred to as a "flow." Each step/algorithm in the sequence typically employs a heuristic to solve a specific problem. In some cases, a specific objective or cost function is used.

The optimization algorithms involved in a design flow are often tuned using suites of benchmark designs. The tuning usually involves selecting a specific variation of heuristic and/or setting default values for various parameters that are used to guide the exploration of the solution space. Tuning for EDA tools that operate on circuit designs targeted to FPGAs can be even more complex due to the wide range and variety of designs on which the tools must effectively solve design closure objectives. A specific variation of heuristic or set of parameter settings that yields suitable results for all types of circuit designs is unattainable. As a result, EDA tools are usually enhanced from one release to the next to improve the mean or median performance relative to a benchmark suite of circuit designs, though a new release does not guarantee that all designs will show improvement.

The complexity involved in achieving timing closure and other objectives often forces designers to perform multiple iterations through the EDA tool flow to achieve closure on a design. Changes to the circuit design are often required between iterations. The effort can sometimes be mitigated by employing multiple strategies in parallel and selecting the best result. Each strategy is a combination of specific variations of optimization heuristics and/or parameter values used in the flow. Experimenting with multiple strategies requires significant computational resources, with no guarantee that the strategy producing the best result will continue to be the most effective across tool releases.

SUMMARY

A disclosed method of processing a circuit design includes stabilizing the circuit design by a design tool that performs one or more iterations of implementation, optimization assessment, optimization, and stability assessment until a threshold stability level is achieved. The method includes determining, in response to satisfaction of the threshold stability level, different strategies based on features of the circuit design and likelihood that use of the strategies would improve timing. Each strategy includes parameter settings for the design tool. The method includes the design tool executing multiple implementation flows using different sets of strategies to generate alternative implementations. The design tool selects one implementation of the alternative implementations nearest to satisfying a timing requirement. The method includes the design tool iteratively optimizing the selected implementation to satisfy the timing requirement, while restricting changes to placement of cells and nets on a critical path of the one implementation to less than a threshold portion of cells and nets on the critical path.

A disclosed system includes a processor and a memory arrangement. The memory arrangement is configured with instructions and in response to execution of the instructions of a design tool for processing a circuit design, and in response to execution of the instructions, the processor performs operations including stabilizing the circuit design by performing one or more iterations of implementation, optimization assessment, optimization, and stability assessment until a threshold stability level is achieved. The design tool determines, in response to satisfaction of the threshold stability level, a plurality of different strategies based on features of the circuit design and likelihood that use of the strategies would improve timing of the circuit design. Each strategy includes a set of parameter settings for the design tool. The design tool executes a plurality of implementation flows using the plurality of strategies to generate a plurality of alternative implementations, and then selects one implementation of the plurality of alternative implementations nearest to satisfying a timing requirement. The design tool iteratively optimizes the one implementation to satisfy the timing requirement while restricting changes to placement of cells and nets on a critical path of the one implementation to less than a threshold portion of cells and nets on the critical path.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 9 is a flowchart of a process performed by the suggestion engine;

FIG. 10 shows a portion of user interface display in which manual and automated suggested actions are provided as output by the suggestion engine;

FIG. 14 shows a flowchart of a process in which one or more strategies are automatically selected and applied to a circuit design that fails to satisfy a timing constraint;

DETAILED DESCRIPTION

Figure 1:
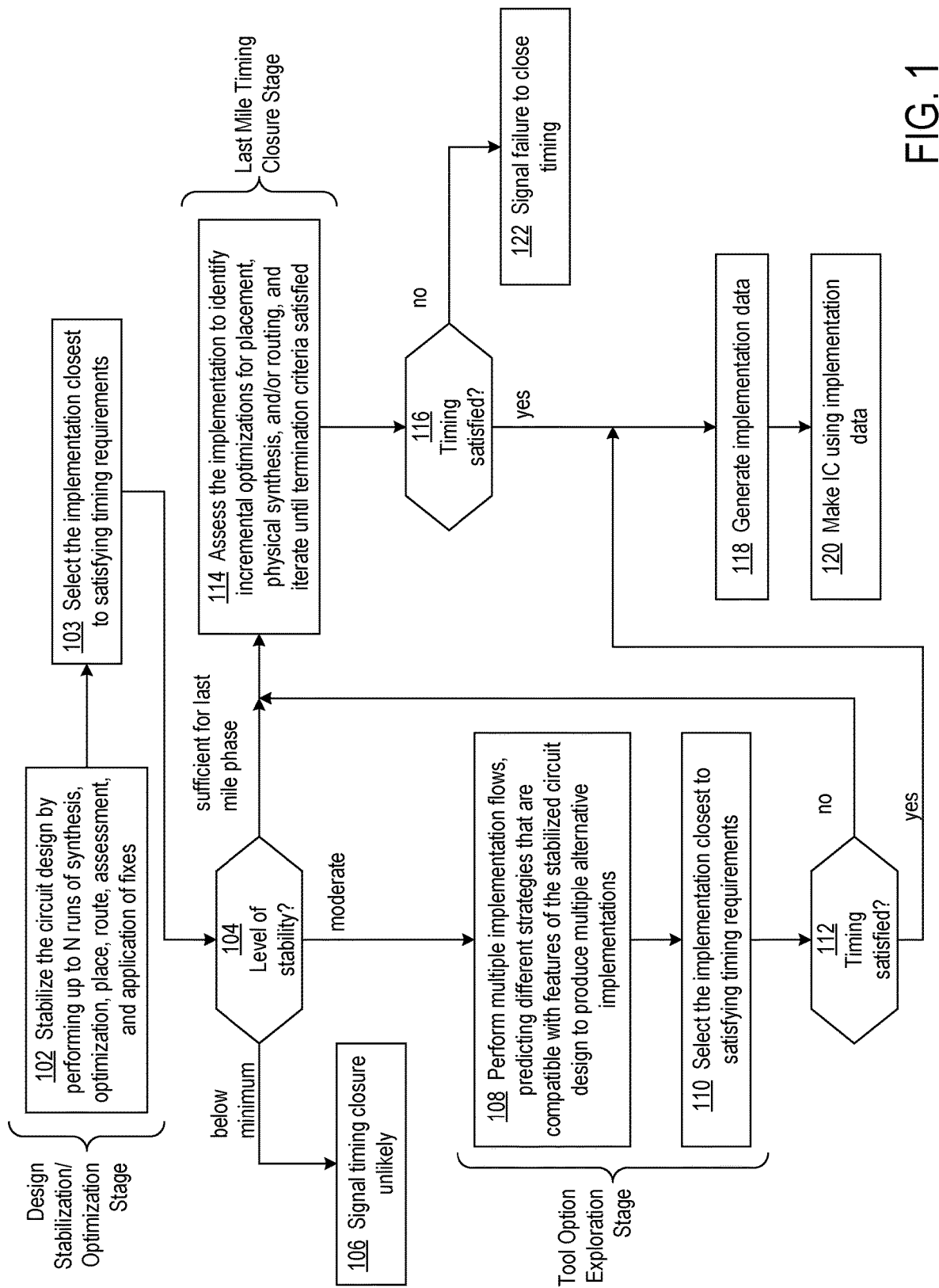
FIG. 1 shows a flowchart of an exemplary process that automates closure of timing requirements in multiple stages.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed multi-stage approaches significantly reduce the need for advanced knowledge of design tools. According to the disclosed approaches, the design is stabilized prior to exploring alternative tool settings, allowing reproducible results with only small changes to the design. As different versions of the design are generated, repetition of the entire implementation flow can be avoided and still achieve timing closure.

According to the disclosed approaches, a design tool(s) automates timing closure by performing an overall implementation flow in multiple stages, with different analyses and optimizations performed within the stages to achieve stage-specific goals to progress toward timing closure. The three exemplary stages include stabilization, exploration, and closure.

In the stabilization stage, the objective is to generate a stable design to form a baseline so that further exploration of design space can be done in the exploration stage. In stabilizing the circuit design, the design tool performs one or more iterations of implementation, optimization assessment, optimization, and stability assessment until a threshold stability level is achieved.

In the exploration stage, various optimization algorithms of the design tool are guided by different sets of parameter values (different "strategies"). The parameters and their values control particular aspects of a heuristic, or act as threshold/factors in cost functions, which guide the solution space exploration of the heuristic. The design tool enters the exploration stage in response to satisfaction of the threshold stability level by the implementation produced in the stabilization stage. The design tool in the exploration stage determines multiple different strategies based on features of the implementation and likelihood that use of the strategies would improve timing. Each strategy includes a set of parameter settings for the design tool. The design tool then executes implementation flows using the identified strategies to generate corresponding alternative implementations. The design tool selects one of the alternative implementations nearest to satisfying a timing requirement for additional processing in the closure stage.

In the closure stage, changes are limited to those that involve small changes to the design and that help to improve timing and that permit the design tool to perform incremental implementation flows. The design tool in the closure stage iteratively optimizes the implementation selected from the exploration stage in order to satisfy the timing requirement. The iterative optimizations restrict changes to the netlist, such as by limiting changes to placement of cells and nets on a critical path of the one implementation to fewer than a threshold portion of cells and nets on the critical path.

FIG. 1 shows a flowchart of an exemplary process that automates closure of timing requirements in multiple stages. At block 102, the design tool performs the stabilization stage. The objective of the stabilization stage is to generate a stable design to form a baseline so that alternative implementations can be considered in the exploration stage. The stability of an implementation depends on how closely the implementation satisfies criteria such as utilization, clocking, congestion, and timing.

In the stabilization stage, the design tool performs one or more implementation runs. Each implementation run can include synthesis, optimization, and/or place-and-route, as well as design assessment and application of fixes. In assessing the resulting implementation in each implementation run, the design tool checks for violations of design checks that can be evaluated post-synthesis. A design check is an aspect or characteristic exhibited by the implementation that could contribute to timing failure, cause routability problems by increasing congestion, and/or violate power constraints. In most instances, the presence in the implementation of an aspect or characteristic specified by a design check indicates a violation of the design check. The design checks can be categorized into classes, such as utilization, timing, design constraints, congestion and clocking. The classes can also include design checks for power consumption and runtime. The design checks can be characterized by the stage of the design flow at which information is available for detecting violations. Each design check can also have an associated value that indicates the level of severity of one design check to other design checks. At block, 103, the design tool selects the implementation that is closest to satisfying timing requirements, which can be the implementation having the greatest value for the worst negative slack (WNS) and/or total negative slack (TNS).

The design tool evaluates the stability of the implementation at decision block 104, after performing the stabilizing runs of block 102. The stability of the design can be judged based on a quality score (described in more detail in conjunction with FIG. 2) that indicates how close the design is to satisfying timing requirements. If after a selected maximum number of runs the level of stability indicted by the quality score is below a minimum, at block 106 the design tool can signal to the user that achieving timing closure is unlikely. If the quality score indicates that timing is likely to be easily closed, the exploration stage can be bypassed, and the design tool can proceed to the closure stage at block 114.

Otherwise, if the quality score is greater the minimum and less than the score that indicates timing can be easily closed, the design tool continues to the exploration stage of block 108. In the exploration stage, multiple implementation runs are executed beginning with the implementation produced by the stabilization stage. The optimization algorithms in the exploration stage are guided by different sets of parameter values. The sets of parameter values control specific variations of a heuristic, or act as threshold/factors in cost functions which guide the solution space exploration of the heuristic.

The set of specific settings of these parameters is referred to as a "directive" and can be a major step of the implementation flow such as logic optimization, placement, routing, or physical synthesis. An implementation flow can be built by combining different combinations of parameter settings in steps of the implementation flow. A combination of directives for the major implementation steps can be referred to as a "strategy." The disclosed approaches identify a small number strategies (e.g., 3-5 strategies) that are likely to produce the best WNS ratio for the design when compared to a default strategy. Machine learning techniques are used in the exploration stage to select strategies most likely to produce results that improve timing, based on features of the circuit design.

At block 110, the design tool selects one of the implementations produced by the exploration stage based on the worst negative slack (WNS) and/or total negative slack (TNS) of the designs. That is, the design tool can select the one of the designs for which the WNS/TNS is nearest to satisfying timing requirements.

At decision block 112, the design tool determines whether or not the implementation selected at block 110 satisfies timing requirements (WNS/TNS 0).) If the selected implementation satisfies timing requirements, the closure stage can be bypassed, and processing can proceed to block 118. Otherwise, the design tool proceeds to the closure stage at block 114.

In the closure stage, the implementation is assessed to determine optimizations that are suitable for incremental placement, physical synthesis, and/or routing ("incremental optimizations"). Incremental optimizations are small changes to the implementation that can help to reach timing closure. The flow is incremental in that only changed portions and neighboring portions of the circuit design are re-implemented. The closure stage can repeat iterations of assessment and incremental optimization until timing requirements are satisfied, or until a time limit or a maximum number of iterations have been performed.

At decision block 116, the design tool determines whether or not the implementation satisfies the timing requirements. At block 122, the design tool can signal to the user failure to achieve timing closure. Otherwise, at block 118 implementation data is generated. For example, bitstream generation tools can be executed to generate configuration data for an FPGA. Other tools can generate configuration data from which an application-specific (ASIC) can be fabricated. At block 120, a circuit can be implemented by way of configuring a programmable IC with the configuration data or fabricating, making, or producing an ASIC from the configuration data, thereby creating a circuit that operates according to the resulting circuit design.

Figure 2:
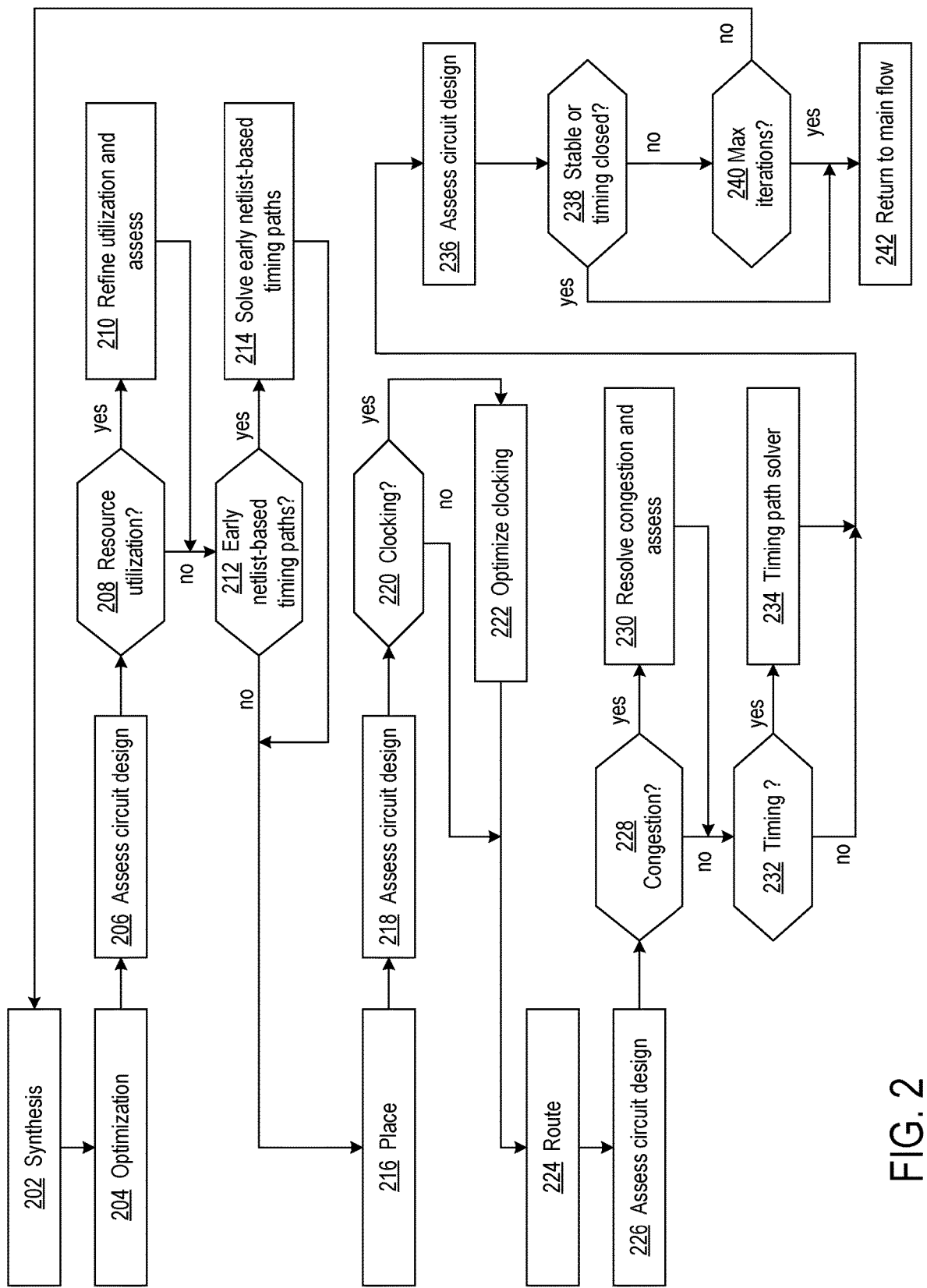
FIG. 2 shows in additional detail, a process of stabilizing a circuit design according to a stabilization stage.

FIG. 2 shows in additional detail, a process of stabilizing a circuit design according to the stabilization stage described above. In the stabilization stage, the design tool iteratively performs an implementation run, assesses the circuit design for stability, and performs identified optimizations in a particular order.

Based on the issues identified by assessments performed during the stabilization stage, the design tool refines the implementation, and the refinements are made in a particular order. The particular order is significant because an issue in a subsequent step could be a manifestation of an issue from an earlier step. For example, a congestion issue could be due to a utilization issue in the implementation. Thus, solving the utilization issue prior to addressing congestion stabilizes the implementation more than solving congestion issue directly.

The assessments can produce individual scores for different metrics and taken together to indicate the stability of the design and how close the design is to satisfying timing requirements. A score at one end of the range can indicate the implementation is likely to easily satisfy timing requirements, a score at the other end of the range can indicate the design is unlikely to easily satisfy timing requirements, and scores in between can indicate relative degrees of difficulty for the implementation to satisfy timing requirements. The assessment indicates issues the design is facing under the categories of utilization, clocking, early netlist-based timing paths, congestion, and timing.

At block 202, the design tool synthesizes the circuit design, such as by translating an RTL specification into a netlist. Optionally, the synthesis can also include high-level synthesis of high-level language source code into RTL code. The design tool performs optimization processing on the circuit design at block 204.

At block 206, the design tool assesses the state of the design resulting from synthesis and optimization, for a resource utilization satisfaction level. The satisfaction level can be quantified as an individual score. A score at one end of a possible range of scores indicates a low level of resource utilization, and a score at the other end of the range indicates a high level of resource utilization.

At decision block 208, the design tool determines whether or not the assessment identified any utilization issues. One example of utilization is utilization of a selected cell type in a certain region of a target device. If the utilization level exceeds a threshold level, a design check has been violated. Another example of a utilization is the number of control sets (combination of set, reset, enable, and clock signals) in the implementation. If the number of control sets exceeds a threshold value, the design check has been violated. The severity level of the violation can be based on the amount by which the threshold is exceeded.

If a utilization issue is reported, at block 210 the design tool undertakes utilization refinement and then assesses the design for early netlist-based timing path issues. Reducing utilization and/or balancing utilization of various primitive reduces the complexity of the designs. Remapping of small shift register logic into registers can improve overall count of look-up tables and is one example of a utilization refinement. Other examples of utilization refinement include retiming registers across operators, which can reduce the number of registers, and remapping RAM types from a critical resource to a less efficient but less critical resource.

At decision block 212, the design tool determines whether or not any early netlist-based timing path issues were identified in the assessment. Examples of early netlist-based timing path issues include netlist structures that create congestion, consume excessive numbers of configurable logic blocks, and consume excessive routing resources. If an early netlisting issue is reported, at block 214 the design tool can simplify netlist structure such as by dissolving "LUT1s" (a one-bit look-up table in an FPGA) from the netlist.

The design tool places the circuit design at block 216, and at block 218 assesses the resulting implementation for clocking issues. At decision block 220, the design tool determines whether or not the assessment identified any clocking issues. Examples of clocking issues include clock skew and a sub-optimal clock delay group. A clock delay group includes source and destination pins connected to a common clock node. The clocking issue can be detected by the placement of the common node being sub-optimal. A sub-optimal clock delay group is detected in an implementation having critical paths that span two related clock domains, and the paths do not have the same common node in terms of placement. Each critical path emanates from a different clock region.

If a clocking issue is reported, at block 222 the design tool optimizes distribution of clock signals ("clocking optimization"). Having sub-optimal clocking topologies creates high skew that cannot be addressed by improving net delay or logic delay. Optimizations can include ensuring that the same root is selected for a group of clock signals, optimizing clocking buffers to reduce timing uncertainties, and optimizing PLL settings to reduce output jitter.

The design tool and routes the circuit design at block 224 and then assesses the resulting implementation for congestion at block 226. At decision block 228, the design tool determines whether or not the assessment identified any congestion issues. Routing congestion can impact the timing closure, because nets would detour around the congested area and thereby increase the routing delay. Reducing routing congestion can reduce routing detours, reduce routing delays, and thereby aid in closing timing. An example of a congestion issue is the level of fanout of a net that drives control pins in a particular congestion region. A violation can be determined based on a first threshold value for identifying high-fanout nets and a second threshold value indicating a number of high-fanout nets in the region. The severity level of the violation can be determined based on the number of high-fanout nets in the region. Another example of a congestion design check, which is specific to FPGAs is the level of utilization of look-up table (LUT) RAMs (LUTRAMs) in a region of a target device. A violation can be detected based on the number of LUTRAMs in the region relative to a threshold value, and the severity of a violation can be determined based on the difference between the number of LUTRAMs and the threshold value.

If congestion is detected, at block 230 the design tool can reduce congestion such as by remapping of multiplexer logic and carry logic into LUTs to break the shape and improve the pin density. Congestion can also be reduced by merging equivalent drivers in a congested region, which reduces unnecessary routing overlaps. Density can be reduced by increasing the specified sizes of selected primitives, which results in the primitives being placed farther apart. Large LUTs can be partitioned into smaller LUTs based on locations of drivers. If the reduction of the overall wirelength of the LUT inputs exceeds the output net length, congestion may be reduced.

After resolving congestion issues, at block 230 the design tool assesses the resulting implementation for satisfaction of timing requirements. At decision block 232, the design tool determines whether or not the assessment identified any timing issues. An example of a timing issue is the worst negative slack (WNS) of the implementation. The violation of a WNS check can be determined based on a threshold value. Different design flow stages can have different threshold values, and the severity of the violation can be based on the amount by which the WNS differs from the threshold. Another example of a timing check is the presence of macros in critical paths. A violation can be determined by the presence of a macro in a critical path, and the severity of the violation can be based on the number of macros in the N most critical paths.

If a timing issue is detected, at block 234 the design tool invokes a timing path solver algorithm. The timing path solver generally either reduces signal delay (logic delay or net delay) on critical paths. Replication of high fanout nets from a critical path can improve the net delays.

Figure 3:
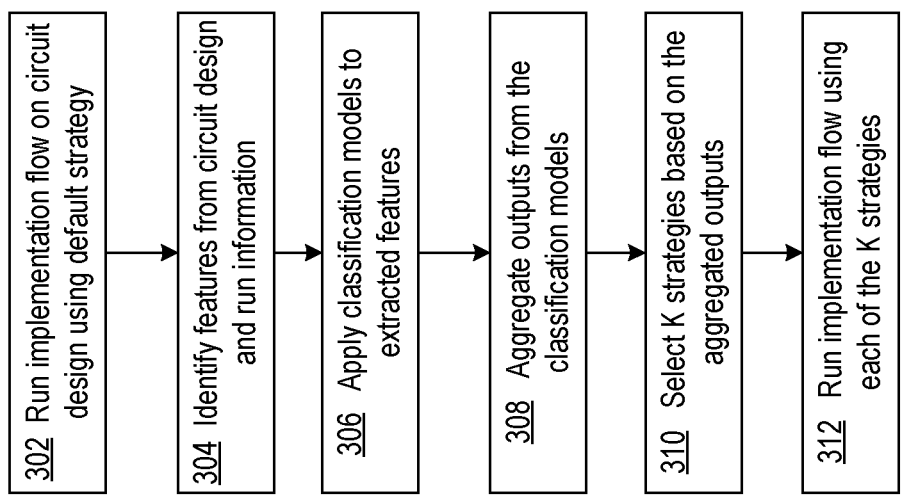
FIG. 3 shows a flowchart of a process in which one or more strategies are automatically selected and applied to a circuit design.
Figure 11:
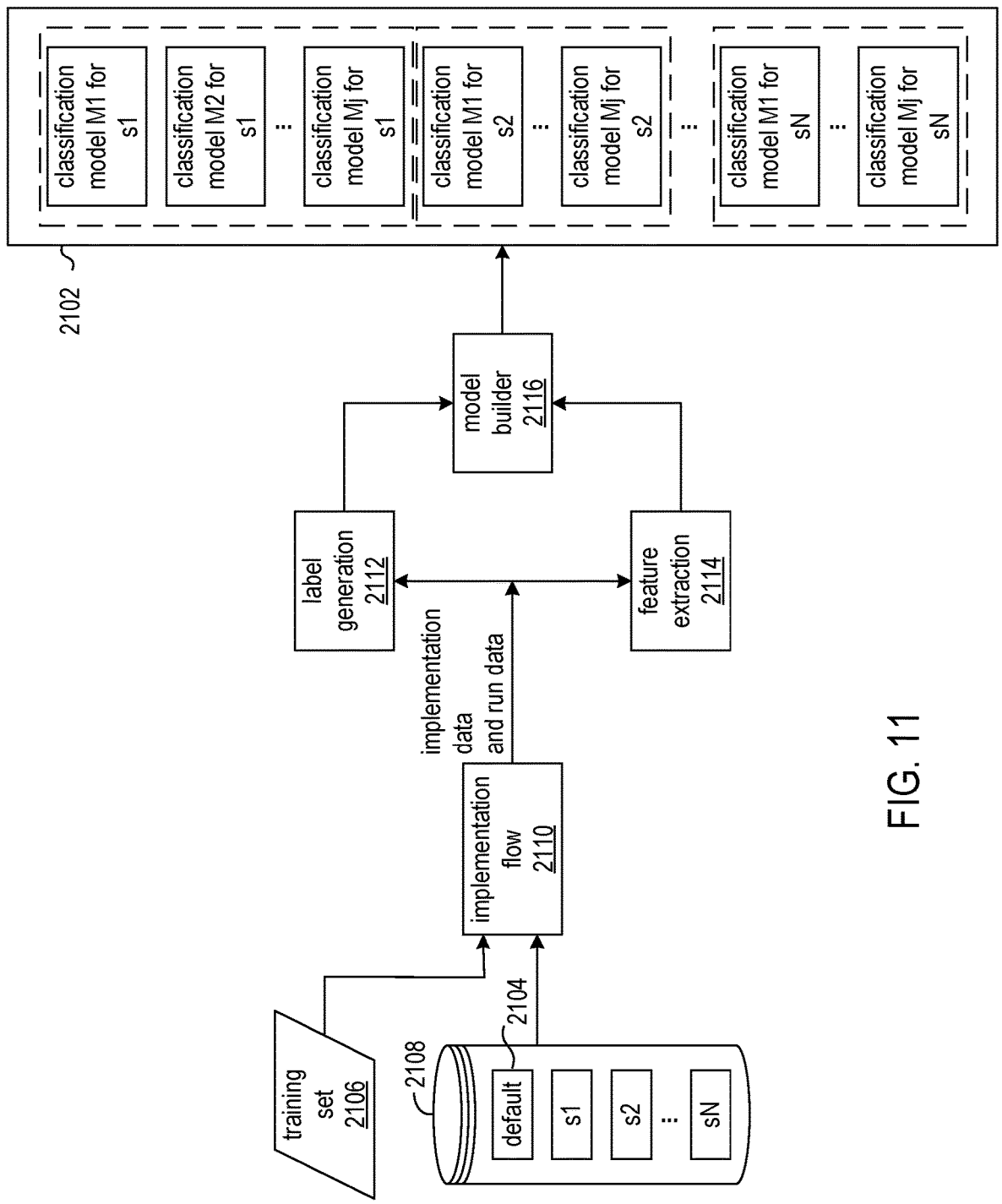
FIG. 11 shows a data flow and process flow for creating classification models that can be used in to select strategies for improving a metric of a circuit design.

At block 236, the design tool assesses the circuit design based on the stability levels described above. At decision block 238, the design tool determines whether or not the combined scores from the assessments indicate the implementation is stable or if timing requirements have been satisfied. If either condition is satisfied, at block 242 control is returned to block 103 of FIG. 1. Otherwise, at decision block 240 the decision block checks whether or not a maximum number of iterations of the stabilization stage have been performed. If not, the process repeats beginning at block 202. Once a maximum number of iterations have been performed, the design tool returns to block 103 of FIG. 1. FIG. 3 shows a flowchart of a process in which one or more strategies are automatically selected and applied to a circuit design (the "current circuit design") that fails to satisfy a constraint. At block 302, the implementation flow process is performed on the current circuit design using a default strategy. The feature set of the current circuit design is identified at block 304 by a feature extraction process (FIG. 11).

Blocks 306, 308, and 310 apply the classification models and select from the available strategies, a list of strategies based on how effective applications of the strategies are likely to be. At block 306, a design tool applies the classification models to the feature set identified in block 304. Each classification model is associated with one strategy of the multiple strategies available for configuring parameters associated with the implementation flow process. The application of a classification model to the feature set of the current circuit design indicates the likelihood that application of the associated strategy would improve the target metric of the circuit design. In an exemplary application, the likelihood is specified by a probability that application of the strategy would improve the circuit design by a range quantified by percentages. For example, application of one classification model to a feature set can indicate the probability that application of the strategy would improve the circuit design having the feature set by at least 5% but less than 7%.

The design tool at block 308 aggregates the outputs from the classification models. The aggregation process sorts the strategies in order of how effective the strategies are likely to be in improving the target metric. FIG. 14 shows an exemplary approach for aggregating the outputs of the classification models. As each strategy can have multiple associated classification models and each classification model can present a different probability that the application of associated strategy can provide a different level of improvement, simply selecting one or more strategies for which the associated classification models output the greatest probabilities may not provide the most useful strategies. For example, if the greatest probabilities are those indicated by classification models that are associated with the smallest possible improvements in the target metric, application of the strategies associated with those classification models may not provide the needed level of improvement. The aggregation process considers both the probabilities and the levels of improvement indicated by the classification models in ranking the strategies.

At block 310, the design tool selects one or more (K) strategies from the strategies as ranked by the aggregation process of block 308, and the selected strategies are applied to the implementation flows at block 312. The flows can be executed in parallel.

Figure 4:
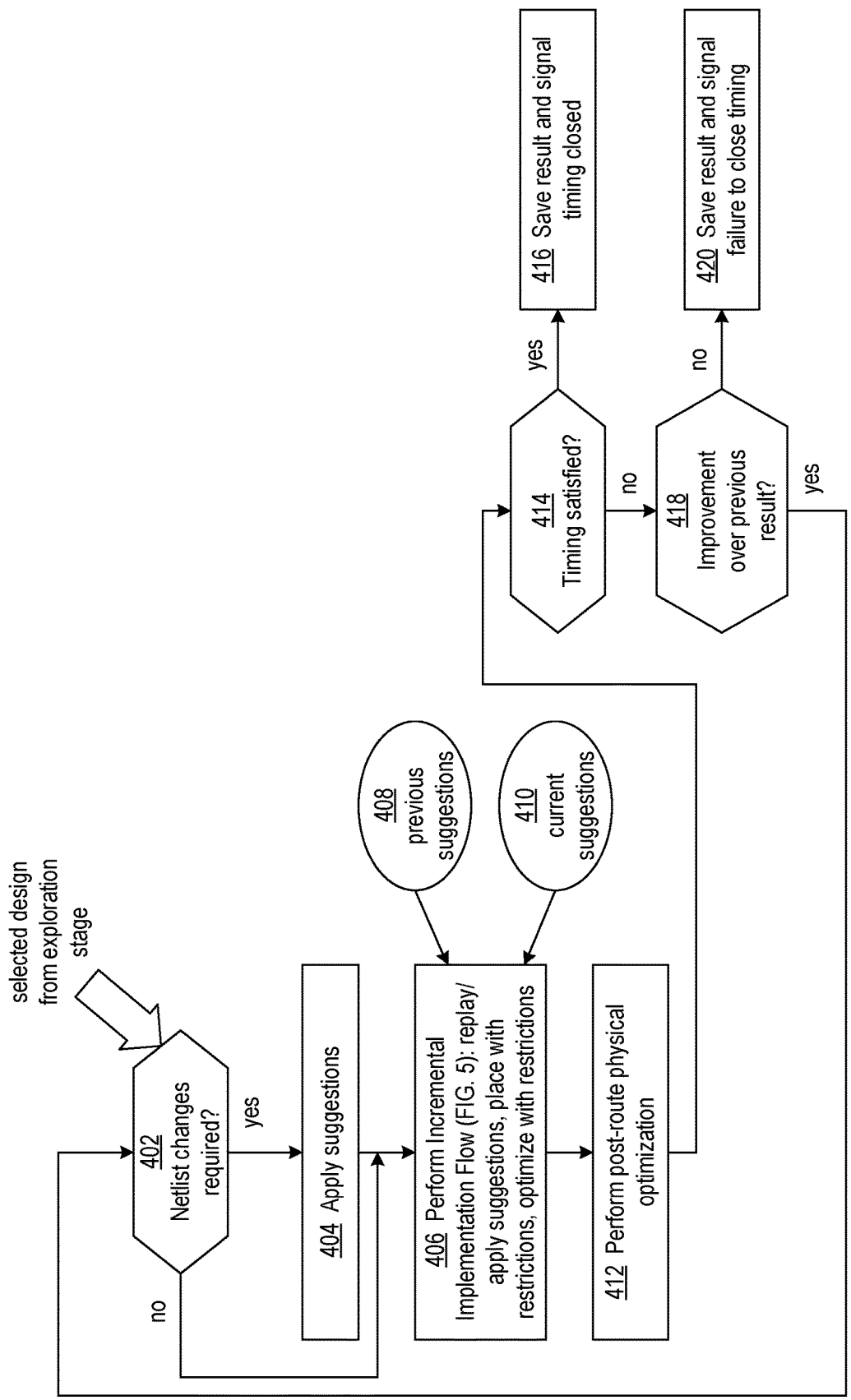
FIG. 4 shows a flowchart of the last mile stage of an overall implementation flow according to the disclosed approaches.

FIG. 4 shows a flowchart of the "last mile" stage of an overall implementation flow according to the disclosed approaches. In the last mile stage, the worst negative slack (WNS) of the design is almost 0, for example. The last mile stage of the disclosed approaches scales to provide a generalized flow where the aggression level can be tuned based on changes appropriate for a specific design or class of designs. The tuning can be done through automatic analysis. Choice of the aggression level balances between being able to close timing versus not making any changes to the design.

Most design tools have optimization algorithms that can be applied to improve specific critical paths. In the closure stage, the particular combination of algorithms that should be used and the paths on which those algorithms should be applied will likely vary widely from design to design. Once a design is in the closure stage, the identified changes are very specific and appropriately applied in order to improve the WNS and/or TNS. Hill-climbing may be helpful to move the design out of a local minimum. According to the disclosed processes, the hill-climbing is limited so that the TNS does not degrade significantly. If significant hill-climbing is required then larger changes may be required to satisfy timing requirements.

The last mile stage employs an incremental implementation flow of placement, physical synthesis and routing to ensure that timing improves without significantly changing the implementation of the design. The netlist selected from the exploration stage is input to decision block 402. At block 402, the design tool uses a set of metrics to evaluate how close a design is to satisfaction of timing requirements. If the design is sufficiently close to satisfying timing requirements, the design is said to satisfy "last mile criteria." When last mile criteria are satisfied, the last mile flow, which involves a limited set of placement, physical synthesis and router optimizations, can be performed.

The set of metrics used to differentiate between satisfying or not satisfying last mile flow criteria can be based on the following: WNS, TNS, performance constraints, a slack histogram of the top critical paths and/or failing endpoints, hold time impact on setup time for given paths, path slack before and after an optimization or change, prediction of the gain in quality of results expected from a specific suggestion/optimization, whether a specific optimization or suggestion will impact critical paths, clock skew on top critical paths or presence of unbalanced clocking structures, logic delay versus routing delay distribution on top critical paths, and whether critical paths pass through a congested area.

If merited, at block 404 the design tool selects netlist modifications and makes those modifications to the circuit design. Specifically, the design tool chooses paths and changes to the circuit design directed at improving the WNS and/or TNS. For example, paths that fail timing requirements can be completely redone. The tool can also choose the order in which paths are to be targeted.

The changes can include specific physical synthesis optimizations, redoing placement and routing of the selected paths and/or adding a hill climbing step. Physical synthesis optimizations can include, for example removing a register from a shift register primitive to improve the balance the delay between cells and merging LUTs in order to reduce the number of logic levels.

In redoing the placement and routing of a small set of paths in the design, the placement and routing can be performed after making a specific netlist change, such as rewiring or fanout replication. The placement and routing changes can be proportional to the size of the problem which is addressed. That is, larger netlist changes will implicate larger placement and routing edits. The goal of redoing placement and routing is to leave as much of the design untouched as possible, while allowing the tool flexibility to resolve the issue.

After making any merited netlist changes, if any, in the incremental implementation flow of block 406, the design tool uses previous suggestions 408 and current suggestions 410 and invokes a limited set of placement, physical synthesis and router optimizations in an effort to satisfy timing requirements. The previous suggestions 408 are the modifications determined in previous iterations of the closure stage, and the current suggestions 410 are the modifications determined in the current iteration at decision block 402.

The last mile flow preprocesses the current suggestions as well as re-applying the suggestions of previous iterations. The last mile flow performs algorithms that are tuned to change placement by less than a selected amount (e.g., less than 0.5% of cells that are on critical paths), and closure of timing is attempted in incremental improvements in the WNS. The last mile flow enables physical synthesis optimizations only for cells and nets that are affected by the applied suggestions; more difficult optimizations are disabled or deemphasized to reduce the extent of change.

At block 412, the design tool performs post-route physical optimization, and at decision block 414 determines whether or not timing requirements are satisfied. If the timing requirements are satisfied, at block 416 the design tool saves the current state of the design and signals that timing is closed. Otherwise, at decision block 418 the design tool determines whether the resulting design is an improvement over the previous result, such as by comparison of the WNSs/TNSs of the versions. If the current result is an improvement over the previous result, or the current result does not improve the WNS/TNS but makes the WNS/TNS worse by less than a threshold established for hill climbing, the design tool returns to decision block 402 to operate on the current state of the design. Otherwise, at block 420 the design tool saves the result and signals a failure to close timing.

Figure 5:
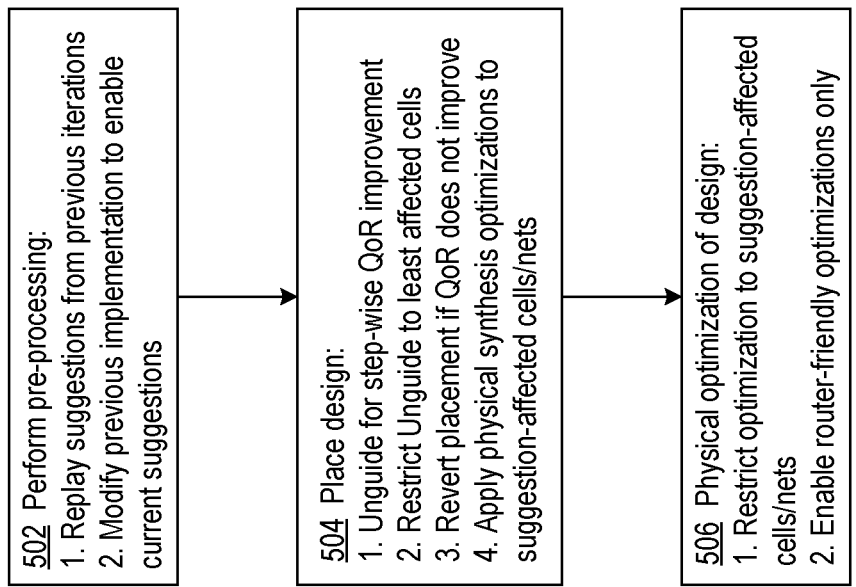
FIG. 5 is a flowchart of an exemplary incremental implementation flow as part of the last mile stage.

FIG. 5 is a flowchart of an exemplary incremental implementation flow as part of the last mile stage. At block 502, the design tool performs pre-processing by replaying the suggestions from previous iterations of the last mile stage in order to apply changes made in previous iterations of the last mile stage to the current netlist. The "current netlist" is the netlist generated from the selected design input to the last mile stage (at block 402 FIG. 4) and having changes applied at block 404 (FIG. 4).

After replaying the previous suggestions, the design tool modifies the previous implementation to enable current suggestions. For example, the design tool can unplace cells relevant to the current suggestions and delete clock routing so that placer-specific suggestions can take effect.

At block 504, the design tool places the design. In placing the design, the tool operates in an "unguided" mode, which provides step-wise improvement of quality of results. In "guided" mode, the placement of cells from previous runs is used to influence placement. In unguided mode, cells on critical cells are unplaced, and the placement process is allowed greater flexibility to assign the cells to new locations.

In placing the design, the number of changes is limited. For example, chances to the placement can be limited to fewer than a threshold percentage (e.g., 0.5%) of cells that are on critical paths. Also, timing closure is attempted in step-wise improvements in the WNS. For example, if the current WNS=−50 ps, the placement process can first attempt to achieve −25 ps. Once the WNS is improved to −25 ps, in the next iteration of last mile processing, the placement process can attempt to improve the WNS to −10 ps, and in the next iteration attempt to improve the WNS to 0 ps.

In performing placement in the last mile process, the design tool restricts unguide to least affected ones of the cells. For example, if the target device is an FPGA, least affected cells can include crossings of super logic regions, macroblock paths etc., and the unguiding of placement can be limited to those elements.

If the quality of results does not improve from placement (i.e., WNS/TNS worsens), the placement is reverted. That is, the un-guided cells will not be placed into new locations if the WNS/TNS is worse than the WNS/TNS of the previous implementation.

The placement performed in the last mile process applies physical synthesis optimizations that are specific to the current suggestions. The physical synthesis optimizations in the placer work on the cells and/or nets that are in timing critical paths or are targeted by the specific suggestion. For example, optimization of fanouts is performed only on timing critical loads of a cell.

At block 506, the design tool performs physical optimization in the incremental implementation phase. In performing physical optimization, the optimizations are restricted to cells/nets that are affected by the suggestions identified in the last mile stage. Optimizations are avoided on fully reused paths as much as possible. The optimizations can include, in addition to the optimizations of block 504, fanout replication, netlist modification, remapping of control set pins, combining LUTs etc. However, during physical optimization in the incremental implementation phase, optimizations are restricted to those that are "router friendly," and more difficult optimizations are disabled or limited in order to reduce the extent of changes to the design. For example, optimizations that make large changes to the netlist, unplaces a large number of cells, or remaps control sets will require rerouting of corresponding nets. Additionally, for optimizations in designs that are targeted to an FPGA, optimizations involving digital signal processors, ultra RAMs, and block RAM optimizations can be disabled. Also, fan-out optimization can be run with a reduced threshold. By default, fanout optimization attempts to improve timing (slack) to +2 ns, for example. In the incremental implementation phase, the target slack is reduced to 0 ns in order to minimize netlist changes.

Figure 6:
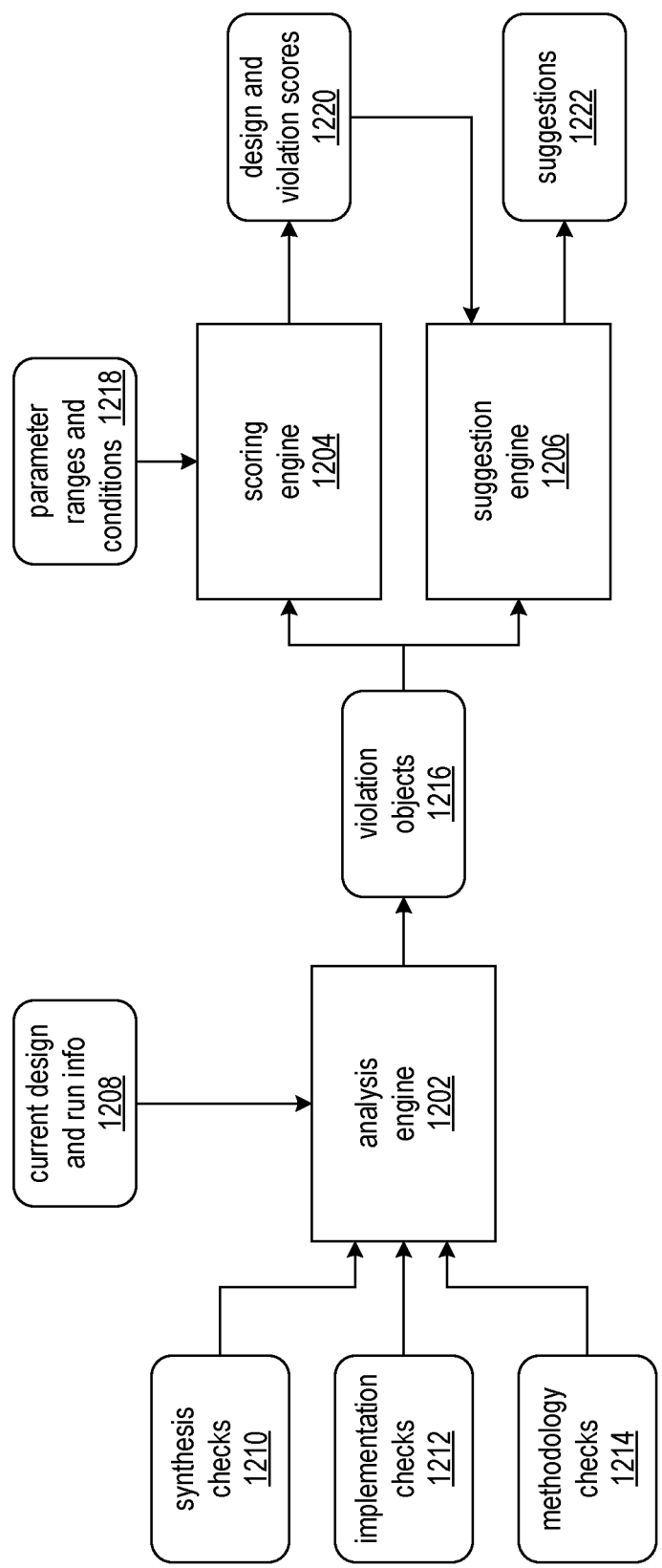
FIG. 6 shows components of a design tool for assessing a circuit design for violations of design checks, and presenting suggested actions for resolving detected violations.

FIG. 6 shows components of a design tool for assessing a circuit design for violations of design checks, and presenting suggested actions for resolving detected violations. The analysis engine 1202, the scoring engine 1204, and the suggested action engine 1206 are components of the design tool that can implement algorithms that perform the assessment and presentation of suggested actions. The synthesis checks 1210, implementation checks 1212, and methodology checks 1214 are data files that specify the design checks against which the current state of the circuit design and run information 1208 is to be evaluated. The analysis engine generates violation objects 1216 that describe the detected violations of the design checks along with associated suggested actions. The scoring engine 1204 uses data in the parameter ranges and conditions 1218 to generate a design score, which indicates a satisfaction level of the design, and individual violation scores 1220, which indicate severity levels of the violations. Based on the violation objects and the design and violation scores, the suggested action engine 1206 outputs the suggested actions 1222.

The synthesis checks 1210, implementation checks 1212, and methodology checks 1214 specify patterns that are used by the analysis engine 1202 to detect violations. Each design check can have an associated initial score that indicates the severity of a violation of that design check.

The analysis engine 1202 inputs the synthesis checks 1210, implementation checks 1212, and methodology checks 1214 and counts occurrences of the pattern in selected paths or regions of the current design and run info 1208. The selected paths can be those identified as critical by way of static timing analysis. Selected regions can be identified by storing data during the placement and routing phase indicating the portions of the design that were difficult to place and route. The analysis engine 1202 generates violation objects 1216 from the detected violations. Each violation object 1216 stores information that identifies the relevant path or regions, information that describes the violated design check, information that indicates the severity (e.g., a score) of the violation, and information that indicates one or more suggested actions for resolving the violation.

The scoring engine 1204 inputs the violation objects 1216. For each violation object 1216, the scoring engine 1204 determines the severity level of the violation and assigns a corresponding score. An aggregator function of the scoring engine 1204 determines a satisfaction level for the entire circuit design based on the categories of design checks and scores of detected violations. As described above the categories of design checks include utilization, timing, design constraints, congestion and clocking. The aggregator function determines an overall score for each category based on the violations of the design checks in that category.

The severity level of a violation of a design check can vary by the phase of the design flow in which the violation was detected. For example, a setup slack of 300 ps may have a medium severity level after placement, but a high severity level after routing. The different severity levels and conditions for detecting violations are specified in the parameter ranges and conditions data 1218. The parameter ranges and conditions can be specified in an extensible markup language (XML) file in order to make the scoring mechanism data-driven and easy to update.

Table 1 shows an example of different parameter ranges and scores associated with violations of design checks involving utilization of resources within an area of a programmable integrated circuit (IC). The example involves a programmable IC having FPGA circuit resources ("Primitive") including LUTs, flip-flops ("SLICEFF"), digital signal processors ("DSPs"), and RAM resources ("RAMB-TILE") within an area termed a super logic region (SLR). Each primitive has an associated threshold value for detecting a violation. For example, if more than 90% of the LUTs in an SLR are consumed by the circuit design, the LUT utilization design check is violated.

TABLE 1

| Primitive | Threshold | Score 2 | Score 1 |
|---|---|---|---|
| LUT | 90% | 90 –> 95 | 95 –> 1000 |
| SLICEFF | 70% | 70 –> 75 | 75 –> 1000 |
| DSP | 80% | 80 –> 95 | 95 –> 1000 |
| RAMBTILE | 80% | 80 –> 95 | 95 –> 1000 |

A utilization violation can have a different level of severity depending on the amount by which the utilization exceeds the threshold. For example, if the number of LUTs used by the circuit design in an SLR is between 90% and 95%, the severity level of the violation is indicated by a score of 2, and if the number of LUTs used by the circuit design in an SLR is between 95% and 100%, the severity level of the violation is indicated by a score of 1. A lower score indicates a more severe violation.

Table 2 shows an example of a design check having different thresholds for detecting violations in different phases of the design flow as well as different scores in different phases. The example design check is the worst negative setup slack. Each phase of the design flow has an associated threshold value for detecting a violation. The synthesis and optimization phases both have threshold values of −0.250 ns, the placement and physical optimization phases both have threshold values of −0.300 ns, and the routing phase has a threshold value of −0.100 ns.

TABLE 2

| Phase | Threshold | Score 4 | Score 3 | Score 2 |
| --- | --- | --- | --- | --- |
| synthesis | −0.250 ns | −0.250 −> −0.500 | −0.500 −> −1.0 | −1.0 −> −100 |
| optimization | −0.250 ns | −0.250 −> −0.500 | −0.500 −> −1.0 | −1.0 −> −100 |
| placement | −0.300 ns | −0.300 −> −0.750 | −0.750 −> −2.5 | −2.5 −> −100 |
| physical optimization | −0.300 ns | −0.300 −> −0.500 | −0.500 −> −1.5 | −1.5 −> −100 |
| routing | −0.100 | −0.100 −> −0.500 | −0.500 −> −1.0 | −1.0 −> −100 |

Within each phase, a violation of the setup WNS design check can have a different level of severity depending on the amount by which the WNS exceeds the threshold WNS associated with that phase. For example, in the optimization phase, if the WNS is between −0.250 ns and −0.500 ns, the severity level of the violation is indicated by a score of 4; if the WNS is between −0.500 ns and −1.0 ns, the severity level of the violation is indicated by a score of 3; and if the WNS is between −1.0 ns and −100.0 ns, the severity level of the violation is indicated by a score of 2.

The suggestion engine 1206 inputs the violation objects 1216 and the design and violation scores 1220. The suggestion engine 1206 sorts the violation objects in order of most-severe to least-severe based on the violation scores. The suggestion engine 1206 obtains the suggested actions specified in the violation objects and outputs the suggested actions 1222 in the order of severity levels of the violations with which the suggested actions are associated. The suggested actions 1222 can be output to an interactive display for review and action by a designer.

Figure 7:
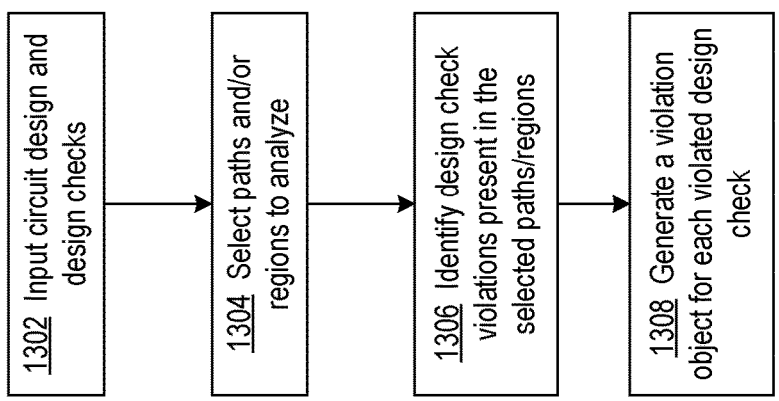
FIG. 7 shows a flowchart of the process performed by the analysis engine in assessing a circuit design for violations of design checks.

FIG. 7 shows a flowchart of the process performed by the analysis engine 1202 (FIG. 6) in assessing a circuit design for violations of design checks. At block 1302, the analysis engine inputs the circuit design and run information associated with the circuit design. The circuit design and run information comprise the data generated by the design tool in performing a phase of the design flow. Each phase of the design flow produces different circuit design and run information.

At block 1304, the analysis engine selects paths and/or regions to analyze. In each phase of the design flow, the design tool determines the critical paths through static timing analysis. The critical paths are the paths selected by the analysis engine 1202 (FIG. 6) for determining violations of design checks.

A region of the target device can be selected by the design tool at block 1304 in response to analyzing the circuit design and run information and finding a greater demand for routing resources in the region than there are routing resources available in the region.

At block 1306, the design tool identifies violations of design checks in the selected paths and/or regions. Violations can be identified by evaluating the condition of each design check based on the input circuit design run information. For each violation of a design check, the design tool generates a violation object at block 1308. Each violation object stores information that identifies the relevant path or regions, information that describes the violated design check, information that indicates the severity (e.g., a score) of the violation, and information that indicates one or more suggested actions for resolving the violation.

Figure 8:
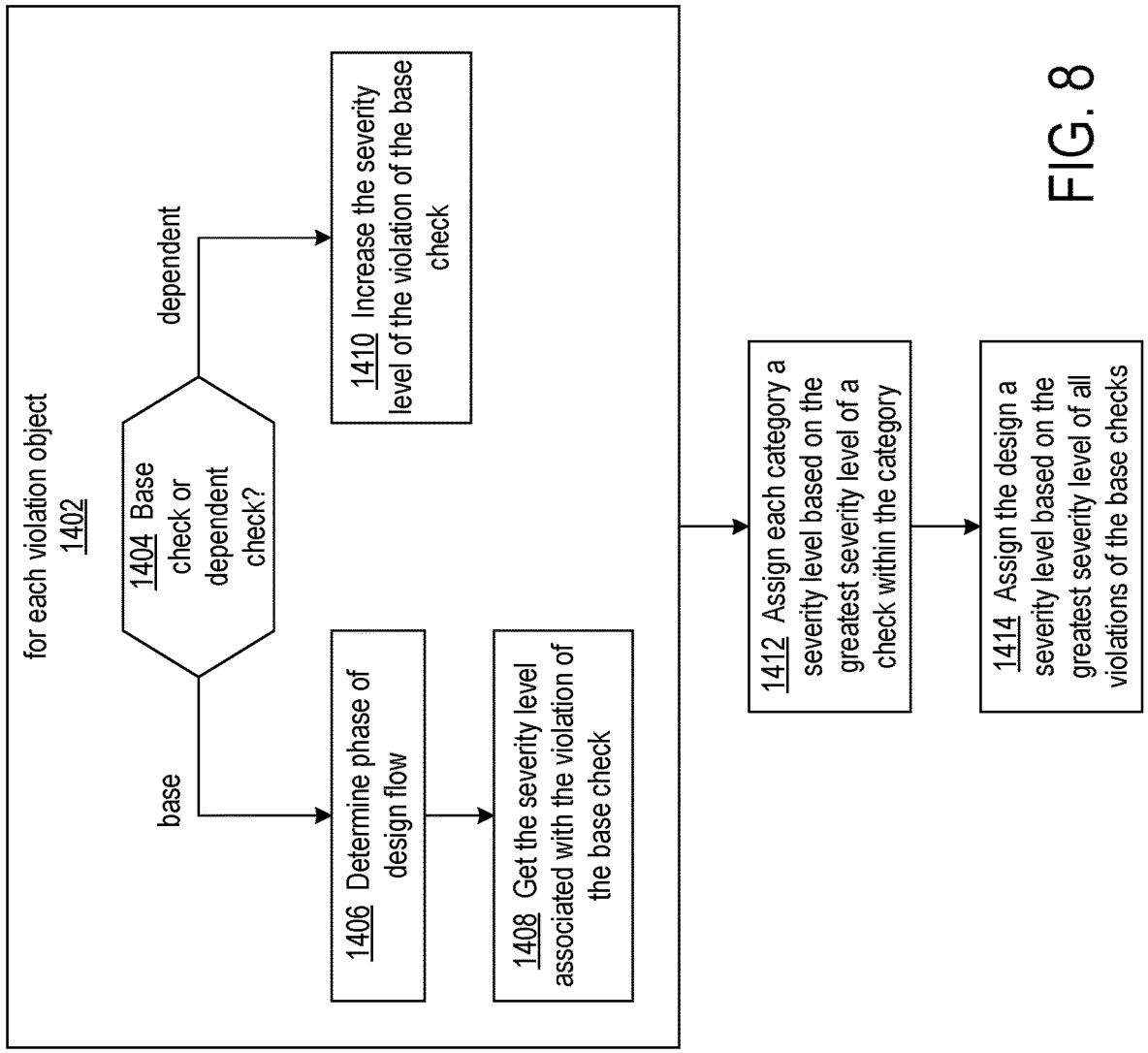
FIG. 8 shows a flowchart of a process performed by the scoring engine.

FIG. 8 shows a flowchart of a process performed by the scoring engine 1204 (FIG. 6). The scoring engine determines severity levels of the violations and uses the severity levels of the violations to determine satisfaction level of the circuit design. In an exemplary approach, the scoring engine determines scores to quantify severity levels and a satisfaction level.

A design check can be either a "base design check" or a "dependent design check." Each dependent design check depends on one of the base design checks, and a base design check can have multiple dependent design checks. The scoring engine determines a score for the violation of a base design check from an initial score associated with the base design check and violations of the dependent design checks of that base design check. Dependent checks worsen the score (increase the severity level) of the corresponding base design check. For example, if the base design check for the setup WNS after the placement phase has a medium severity level, and there are violations of dependent design checks for the number of nets crossing a super logic region, then the scoring engine increases the severity level of the violation (e.g., decreases the score) of the base design check to severe.

The scoring engine determines a score for each class (utilization, timing, design constraints, congestion and clocking) of the design checks from the base design checks of the classes. The minimum score (the most severe violation) across all base design checks is the score (satisfaction level) for the design.

The scoring engine performs the processing of block 1402 for each violation object. At decision block 1404, the scoring engine determines whether the violation object indicates a violation of a base design check or a dependent design check.

The relationship between base design checks and dependent design checks can be specified along with the parameter ranges and conditions of the design checks in an XML file. The XML file can indicate for each design check whether the design check is a base design check or a dependent design check. The XML file can specify identifiers for the design checks, and each base design check can have an associated list of identifiers of dependent design checks of that base design check.

As one example, a base design check is identified as "TIMING-1" and has "TIMING-3" as a dependent design check. TIMING-1 is a design check for WNS setup failures. TIMING-3 is a design check for WNS setup failures having macros in critical paths. As another example, "TIMING-2"

is a base design check, and "TIMING-17" is a dependent design check of TIMING-2. TIMING-2 is a design check for a worst hold slack (WHS) hold failure, and TIMING-17 is a design check for clock uncertainty.

In response to finding a violation object indicating a violation of a base design check, the scoring engine at block 1406 determines the phase of the design flow indicated by the run information 1208 (FIG. 6). Based on the phase of the design flow and any relevant metrics in the violation object, the scoring engine at block 1408 looks-up the severity level of the violation of the base check in the parameter ranges and conditions information 1218 (FIG. 6). The severity level can be indicated by a score as described above.

In response to finding that the violation object indicates a violation of a dependent design check, at block 1410 the scoring engine increases the severity level determined for the violation of the base design check. Each dependent design check can have a severity level, and the severity level of the base design check can be increased by an amount that is proportional to the severity level of the dependent design check. In the exemplary approach, the severity level can be increased by decreasing the score of the base design check.

At block 1412, the scoring engine assigns a severity level to each class of design check based on the severity levels of the violations of the design checks within each class. For example, the utilization class of design checks is assigned the severity level of the most severe violation of the base design checks in the utilization class, the timing class of design checks is assigned the severity level of the most severe violation of the base design checks in the timing class, etc. The most severe violation can be indicated by the lowest score.

The scoring engine at block 1414 determines the satisfaction level of the circuit design based on the severity levels determined for the violations of the classes of design checks. In an exemplary approach, the satisfaction level is determined to be the severity level of the class of design checks having the most severe violation, which is the severity level of the base design check having the most severe violation (lowest score).

FIG. 9 is a flowchart of a process performed by the suggestion engine 1206 (FIG. 6). At block 1502, the suggestion engine sorts the violation objects 1216 (FIG. 6) in order of most severe to least severe based on the violation scores 1220 (FIG. 6). At block 1504, the suggestion engine determines the dependent design check(s) associated with each base design check having a severity level greater than a threshold. In order of most severe violation to least severe violation of the base design checks, the suggestion engine at block 1506 outputs the suggested actions associated with the base and dependent design checks. The suggested actions can include manual actions that can be taken by the designer and/or automated procedures that can be initiated by the designer. At block 1508, the suggestion engine executes an automated procedure in response to user selection of a display object or a keyed or verbal command.

FIG. 10 shows a portion of user interface display 1600 in which manual and automated suggested actions are provided as output by the suggestion engine 1206 (FIG. 6). The suggested actions are for the design checks identified as CLOCK-5 AND CLOCK-12. The text in the "Next Steps" column indicate the actions that the designer can take to resolve the indicated violations. For the violation of the design check CLOCK-12, the automated action is performed by the Tcl script "source RQSImplCommon.tcl." In one approach, the Next Step can be an object that the user can select, and in response to the selection, the referenced script is executed.

The exploration stage employs classification models to select from a large set of strategies, one or more strategies that are most likely to be effective in achieving closure on certain design constraints.

Machine learning techniques are used and classification models can be trained from a set of exemplary large designs. Once trained, the system can quickly identify one or more strategies likely to be suitable for achieving timing closure based on a single run of the EDA tool using a default set of parameter values. The exploration stage uses to advantage the suite of large and realistic designs available for performance evaluation and tuning while mitigating the challenges associated with having a small number of designs available for training. For example, machine learning models in other applications such as image classification and speech recognition are trained with millions of samples. Yet in the current application, the number of designs in the training set is on the order of thousands. Challenges associated with a limited training set are overcome through the formulation of the classification problem and careful selection and engineering of model features.

The exploration stage identifies strategies that are most likely to improve performance or improve the worst negative slack (WNS). The strategies can span all steps of the physical implementation flow, from netlist optimization, to placement, to physical synthesis and routing. As the classification models are built prior to processing of a particular user circuit design, the system can quickly identify suitable strategies, unlike other tools which explore the solution state space of a single design over several runs to choose the strategy for the next run.

In training the machine learning models, the set of available benchmark designs can be randomly divided such that 80% of the designs can be used for training, and 20% of the designs can be used to validate the trained models.

In the exemplary application involving timing closure, a "WNS ratio" is the optimization metric. The WNS ratio is the geometric mean of the achievable frequency improvement over all clock domains in the design, weighting those domains in which the timing constraints are not satisfied. An alternative metric involving timing closure could be the improvement in the achievable frequency of the slowest clock domain in the design.

The optimization algorithms and EDA implementation flow can be guided by setting selected parameters to desired values. The parameters can emphasize or deemphasize specific aspects of a heuristic, or function as thresholds/factors in cost functions that guide exploration of the solution space by the heuristic. The set of specific settings of these parameters is referred to as a "directive" and can be a major step of the implementation flow such as logic optimization, placement, routing, or physical synthesis. An implementation flow can be built by combining different combinations of parameter settings in steps of the implementation flow. A combination of directives for the major implementation steps can be referred to as a "strategy." The disclosed approaches identify a small number of 3-5 strategies that are likely to produce the best WNS ratio for the design when compared to a default strategy.

The exploration stage narrows the solution search space by restricting the strategy choices to a set of approximately 40 strategies. The strategies chosen to be in the set of available strategies are those having parameter settings that have been observed by experts to be most effective in closing timing on customer designs. The set of available strategies thereby leverages hundreds of person-years of experience in resolving timing closure issues. Each strategy can target improvement of one or more aspects of the design known to make timing closure difficult, such as routing congestion, control set distribution, whitespace allocation in the placer, resource utilization of different primitives, net fanout distribution, distribution of control sets, etc.

Identifying a small number of strategies most likely to improve timing significantly reduces computational requirements. Instead of a designer having to run the EDA tool using 30 or more strategies in parallel to find a solution that meets design constraints, the designer can run the EDA tool using 3-5 strategies to find a solution. The disclosed approaches employ machine learning techniques to select strategies. The disclosed approaches also scale well with new strategies added to the pool of available choices.

Machine learning classification models depend on features and labels. A feature is a characteristic of the sample or input, which forms the basis of classification. A label is used to classify each sample design in the training set into different categories.

In the disclosed approaches, the features are divided into the following categories: device features, netlist features, and implementation flow features. Device features are characteristics of the target device on which the design is to be implemented. For exemplary target devices such as ULTRASCALE™, ULTRASCALEPLUS™, KINTEX™, VIRTEX®, and ZYNQ® devices from Xilinx, Inc., the features can include the number of input/output columns, the number of super logic regions, etc. Other target devices can have different features.

Netlist features are characteristics of the design that are independent of the behavior of the EDA tool after having run the tool through logic optimization. In the context of the aforementioned exemplary devices, examples of netlist features can include the utilization of primitives such as look-up tables (LUTs), flip-flops (FFs), block RAMs, carry chains, and digital signal processing (DSP) blocks, the number of control sets, the fanout distribution of nets, etc.

Implementation flow features can include characteristics derived from the progress of the design through the implementation flow of the EDA tool. Examples of implementation flow features can include the wirelength after global placement, the congestion after an initial routing, the worst negative slack after placement, the improvement seen in physical synthesis, etc.

In an exemplary application, the WNS ratio at the end of the implementation flow is used as the label. A margin of at least 1% is used an exemplary approach to indicate improvement with respect to the default strategy. The margin is used to reduce the chances of noise or small fluctuations in the tool optimizations producing erroneous results.

The classification models are constructed to identify the K best strategies for improving a metric of the circuit design, which in the current example is the WNS ratio. Each classification model quantifies the probability that application of the associated strategy to a circuit design having a certain set of features would improve the circuit design by at least a certain percentage. The improvement is measured relative to processing the circuit design through a design flow using a default strategy. In a scenario in which the default strategy produces results that are better than those indicated by the classification models, the tool returns a null set of strategies. In the exemplary implementation, K≤5 has been shown to provide acceptable results.

Multiple classification models can be constructed for each strategy. Each classification model can be associated with a different level of improvement in the targeted metric (e.g., WNS ratio) of the design. In the exemplary application, each strategy has three associated classification models. A first model, which is denoted "M7s" for strategy s, classifies designs according to the likelihood that strategy s would produce at least a 7% improvement in the WNS ratio over the WNS ratio resulting from the default strategy. The second model, which is denoted "M5s," classifies designs according to the likelihood that strategy s would produce at least a 5% improvement in the WNS ratio, and the third model, which is denoted "M1 s," classifies designs according to the likelihood that strategy s would produce at least a 1% improvement. During training, the designs in the training set are processed through the design flow using all of the available strategies, and the features of the designs are correlated with the strategies according to the levels of improvement in WNS ratio produced by the strategies.

The disclosed approaches employ a random forest model to implement the classification models. Alternative binary classification models that could be used in the disclosed methods and systems and include decision trees, boosted trees, warm-start classification methods, support vector machines, or convolutional neural networks. In the inference phase, the design is processed through one iteration of the design flow using a default strategy, such that the design was routed successfully but timing constraints have not been satisfied. Once the initial run is complete, the design can be classified using the classification models M7s, M5s, and M1 s for each strategy s.

Thus, in the example involving classification models M7s, M5s, and M1s for each strategy s, the resulting classification of the design will indicate that application of the strategy s is likely to improve the WNS ratio by at least 7%, or improve the WNS ratio by at least 5% but less than 7%, or improve the WNS ratio by at least 1% but less than 5%, or not improve the WNS ratio at all.

Once the design has been classified for each strategy, an aggregation algorithm is executed to select the K strategies that are most likely to improve the design. According to an exemplary approach, a combination of the probability of model correctness and the percentage improvement in WNS ratio are used to order the strategies from most likely to improve the design to least likely to improve the design.

FIG. 11 shows a data flow and process flow for creating classification models that can be used in to select strategies for improving a metric of a circuit design. As indicated above, in the exemplary application the target metric is the worst negative slack (WNS) ratio. Different strategies can be used to create different classification models to improve metrics other than the WNS ratio.

In constructing the classification models 2102, a default strategy 2104 and N other strategies ("s1", "s2", . . . , "sN") 2108, which can be targeted to the metric of circuit design to be improved, are applied to each sample circuit design in a training set 2106. The default strategy is applied first to the sample circuit designs in the training set in order to establish a baseline against which application of the other strategies s1-sN can be evaluated. The implementation flow 2110 is performed on each of the sample circuit designs in the training set using the default strategy. The implementation flow process can be performed by one or more circuit design tools (collectively, "circuit design tool") that perform netlist optimization, placement, physical synthesis, and routing. The implementation flow outputs circuit implementation data and run data.

The implementation data can specify characteristics of the target device on which the design is to be implemented, netlist features, the circuit structures (e.g., "primitives") to be used in making an operable circuit, connections between the circuit structures, etc. The run data can include data such as wirelength after global placement, the congestion after an initial routing, the WNS after placement, the improvement seen in physical synthesis, the time spent routing the circuit design, etc.

The WNS data resulting from application of the default strategy to the circuit designs in the training set 2106 can be provided to the label generation process 2112, and the label generation process can generate baseline WNS ratios associated with the circuit designs in the training set. That is, each circuit design can have an associated baseline WNS ratio resulting from application of the default strategy. The baseline WNS ratios are provided to the model builder process 2116 for use when strategies s1-sN are applied to the training set.

After performing the implementation flow 2110 using the default strategy 2104, the implementation flow is performed using each of the strategies s1-sN on each of the sample circuit designs in the training set 2106. The implementation data and run data resulting from application of the strategies to the sample circuit designs are provided as input to the label generation process 2112 and to the feature extraction process 2114.

One exemplary strategy can specify a default directive to an optimization phase, a directive to aggressively spread the logic during a placement phase, and a routing directive to choose alternative routing algorithms that require extra runtime but may help resolve routing congestion. Another exemplary strategy can specify a default directive to an optimization phase, a directive to use an alternative set of algorithms for timing-driven placement during later stages/ and a routing directive to prevents the router from relaxing timing to complete routing (if the router has difficulty meeting timing, it runs longer to try to meet the original timing constraints). Another exemplary strategy can specify a directive to merge equivalent drivers in a logic optimization phase, a directive to aggressively spread the logic during a placement phase, a directive to aggressively explore different algorithms in multiple passes of physical optimization, including replication for very high fanout nets, and phase in which a subset of physical optimizations are run on the top critical paths of all endpoint clocks, regardless of slack. The strategy can further specify an explore directive that instructs the router phase to explore different critical path placements after an initial route.

A strategy can also take advantage of internal features of a design tool that a designer may not be given access to. For example, one internal feature of the design tool can limit the number of cells moved across clock regions during detailed placement. Another internal feature can limit the number of tiles having high pin density, and another internal feature can use congestion estimates during iterations of the routing phase.

The label generation process determines the respective levels of improvement in the WNS ratio achieved by application of the strategies to each sample circuit design relative to the baseline WNS ratio associated with that sample circuit design. Thus, for each strategy applied to a particular design in the training set, the label generation process determines the level of improvement in the WNS ratio achieved by application of the strategy to that particular sample design relative to the baseline WNS ratio associated with that sample design. The feature extraction process identifies for each sample circuit design an associated set of features exhibited by the implementation data generated by the implementation flow. The quantified level of improvement and the associated feature set are provided as input to the model builder process 2116.

The model builder builds binary classification models 2102, such as a random forest, according to the input levels of improvement and associated feature sets. Each classification model is associated with one of the strategies, and each strategy can have multiple classification models in the exemplary approach. The exemplary classification models include models M1-Mj for strategy s1, models M1-Mj for strategy s2, . . . and models M1-Mj for strategy sN. Once constructed, each of the classification models 2102 indicates a probability that use of the associated strategy would improve a metric (e.g., a WNS ratio) of a circuit design having a particular feature set by at least the amount associated with the classification model. An alternative approach can have a single classification model per strategy.

Figure 12:
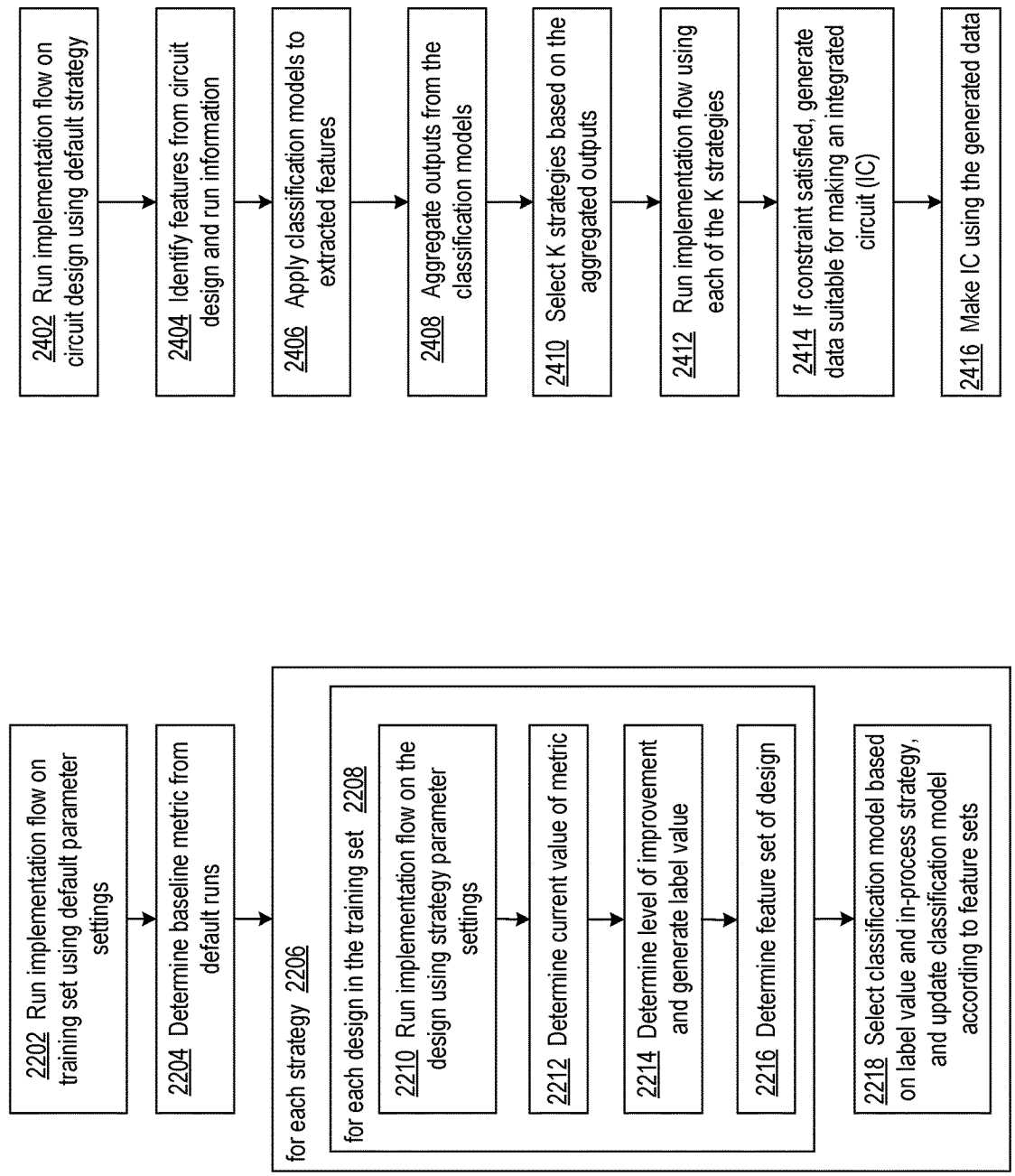
FIG. 12 shows a flowchart of a process for preparing the classification models.

FIG. 12 shows a flowchart of a process for preparing the classification models 2102 in accordance with an exemplary approach. At block 2202, the implementation flow process 110 is run on each circuit design in the training set using a default strategy having default parameter settings. The application of the default strategy is used to establish a baseline against which application of the other strategies s1-sN to circuit designs outside the training set can be evaluated.

At block 2204, the label generation process 2112 determines baseline values of the targeted metric (e.g., WNS ratio) based on the implementation flow processing the designs in the training set using the default strategy. The baseline WNS ratio determined for sample design T, can be expressed as:

WNS ratio$_T$=c-root (WNS$_1$,*WNS$_2$*WNS$_3$**WNS$_C$) where sample design T has C clock domains, and "c-root" indicates a function that computes the $C^{th}$ root of the input.

At block 2206, the in-process strategy is applied to each design in the training set 2106 (FIG. 11) according to the process of block 2208. At block 2210, the implementation flow process 2110 is performed on a design ("in-process design") of the training set using one of the strategies ("in-process strategy") s1-sN. At block 2212, the label generation process 2112 (FIG. 11) determines the current value of the metric based on the data from the implementation flow in which the in-process strategy was applied to the in-process sample design. From the current value of the metric, the label generation process at block 2214 determines the level of improvement in the metric relative to the baseline value of the metric associated with the in-process sample design. In the exemplary application, the level of improvement is indicated by the percentage improvement in the WNS ratio, which can be expressed as:

((WNS ratio$_{current}$-WNS ratio$_{baseline}$)/WNS ratio$_{baseline}$)*100%

At block 2214, the label generation process also generates the label value based on the level of improvement in the target metric. In an exemplary approach, each label corresponds to a range of improvement. As applied to the WNS ratio, for example, one label corresponds to an improvement in the WNS ratio of at least 7% over the baseline WNS ratio (resulting from the default strategy, another label corresponds to an improvement in the WNS ratio of at least 5% and less than 7% over the baseline WNS ratio, another label corresponds to an improvement in the WNS ratio of at least 1% and less than 5% over the baseline WNS ratio, and another label corresponds to an improvement in the WNS ratio of less than 1% over the baseline WNS ratio.

The feature extraction process 114 (FIG. 1) determines the respective feature set of the in-process design at block 2216 by searching the data from the implementation flow process of block 2210 for characteristics relevant to the classification models 2102.

At block 2218, the model builder process 2116 (FIG. 11) determines the parameters of the classification model and/or selects the classification model itself based on the label value and the strategy that resulted in the label value, and updates the classification model based on the respective feature sets of the designs in the training set.

Figure 13:
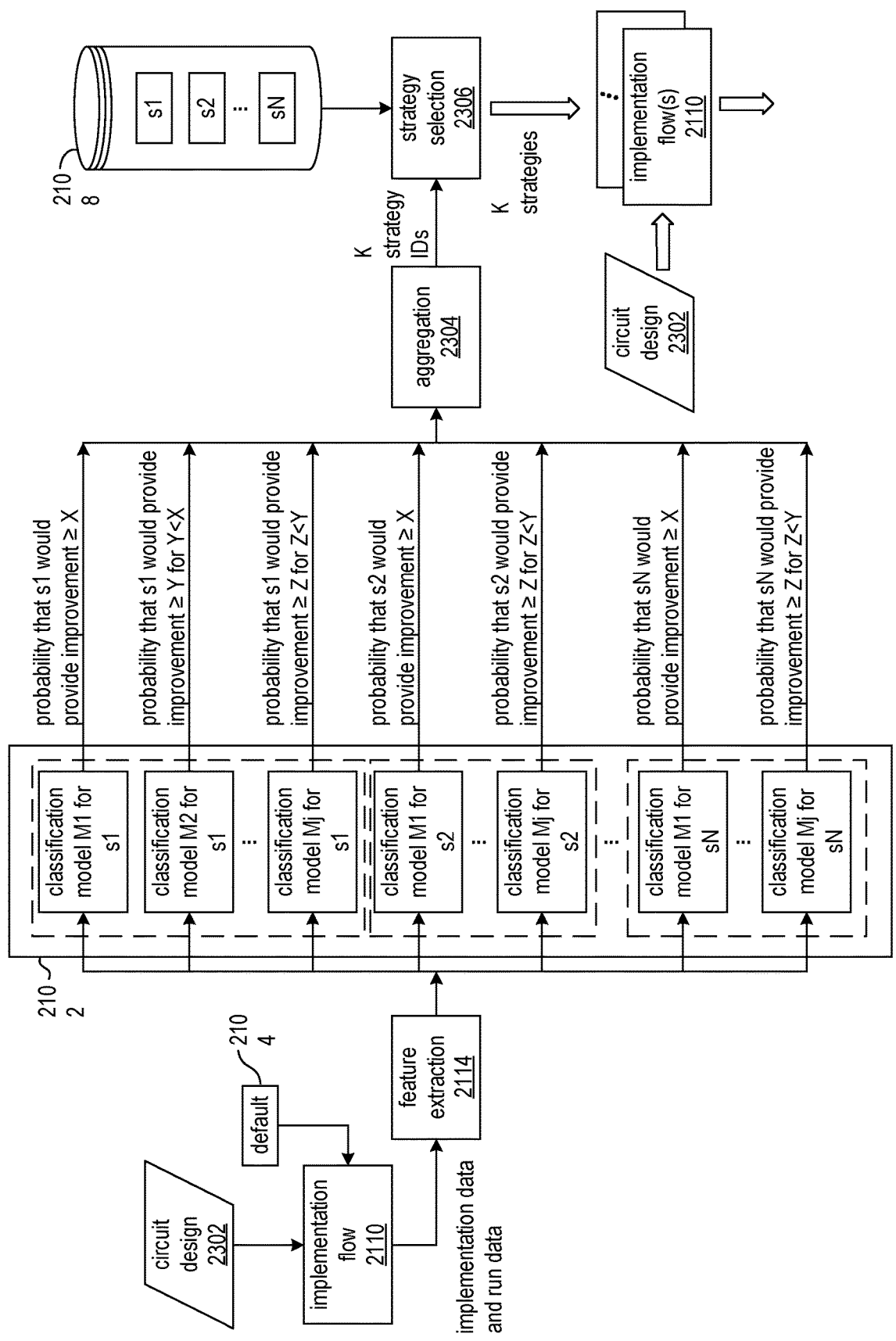
FIG. 13 shows a data flow and a process flow for selecting one or more strategies to apply to a circuit design in order to improve a target metric of the circuit design.

FIG. 13 shows a data flow and a process flow for selecting one or more strategies to apply to a circuit design in order to improve a target metric of the circuit design. The input circuit design 2302 is an exemplary circuit design that fails to satisfy a certain constraint, such as an implementation resulting from the stabilization stage, and one or more of strategies s1-sN may be helpful in resolving the issue. For example, the circuit design 2302 may have setup time violations.

The circuit design is processed through implementation flow process 2110 using the default strategy 2104 (FIG. 11). The implementation data and run data generated by the implementation flow process are provided to the feature extraction process 2114. The feature extraction process determines a feature set from the implementation data and run data and inputs the feature set to the classification models 2102.

The classification models 2102 are applied to the input feature set, and each of the classification models, outputs a probability that the associated strategy would improve the target metric. In the specific exemplary approach, each of the classification models outputs a probability that the associated strategy would improve the target metric by an amount within a certain range. For example, the classification model M1 for strategy s1 outputs a probability that application of strategy s1 would improve the targeted metric more than X, the classification model M2 for strategy s1 outputs a probability that application of strategy s1 would improve the targeted metric at least by Y but less than X, etc.

An aggregation process 2304 is performed on the output probabilities in order to rank the strategies in order from most likely to least likely to improve the targeted metric, factoring in the amounts by which the different strategies might improve the metric. The strategy selection process 2306 reads the one or more (K) strategies of strategies 2108 to apply to the circuit design 2302.

The selected K strategies are individually applied to the circuit design 302 by configuring the design tool(s) with the parameter settings of each selected and performing the implementation flow process 2110. Multiple implementation flow processes can be performed in parallel to apply the K strategies to the circuit design if sufficient computational resources are available. Otherwise, multiple implementation flow processes can be performed sequentially if sufficient computational resources are not available. The implementation data and run data resulting from application of the selected strategies by each of the implementation flows can be analyzed to determine if any of the strategies satisfied the constraint.

FIG. 14 shows a flowchart of a process in which one or more strategies are automatically selected and applied to a circuit design (the "current circuit design") that fails to satisfy a constraint. At block 2402, the implementation flow process is performed on the current circuit design using the default strategy. The feature set of the current circuit design is identified at block 2404 by the feature extraction process 2114 (FIG. 11).

Blocks 2406, 2408, and 2410 apply the classification models and select from the available strategies 2108 (FIG. 11), a list of strategies based on how effective applications of the strategies are likely to be. At block 2406, a design tool applies the classification models to the feature set identified in block 2404. Each classification model is associated with one strategy of the multiple strategies 2108 (FIG. 11) available for configuring parameters associated with the implementation flow process. The application of a classification model to the feature set of the current circuit design indicates the likelihood that application of the associated strategy would improve the target metric of the circuit design. In an exemplary application, the likelihood is specified by a probability that application of the strategy would improve the circuit design by a range quantified by percentages. For example, application of one classification model to a feature set can indicate the probability that application of the strategy would improve the circuit design having the feature set by at least 5% but less than 7%.

The design tool at block 2408 aggregates the outputs from the classification models. The aggregation process sorts the strategies in order of how effective the strategies are likely to be in improving the target metric. FIG. 5 shows an exemplary approach for aggregating the outputs of the classification models. As each strategy can have multiple associated classification models and each classification model can present a different probability that the application of associated strategy can provide a different level of improvement, simply selecting one or more strategies for which the associated classification models output the greatest probabilities may not provide the most useful strategies. For example, if the greatest probabilities are those indicated by classification models that are associated with the smallest possible improvements in the target metric, application of the strategies associated with those classification models may not provide the needed level of improvement. The aggregation process considers both the probabilities and the levels of improvement indicated by the classification models in ranking the strategies.

At block 2410, the design tool selects one or more (K) strategies from the strategies as ranked by the aggregation process of block 2408, and the selected strategies are applied to the implementation flow at block 2412.

At block 2414, the data resulting from the runs of the implementation flow using the K strategies is analyzed to determine whether or not the targeted metric improved enough to satisfy the design constraints. If the design constraints are satisfied, the implementation data from one of the runs can be selected and further processed to generate data that is suitable for making an integrated circuit. Circuit configuration or fabrication tools (not shown) can be used to make a circuit by configuring a device having programmable logic or fabricating an application specific integrated circuit (ASIC) based on the generated data at block 2416.

Figure 15:
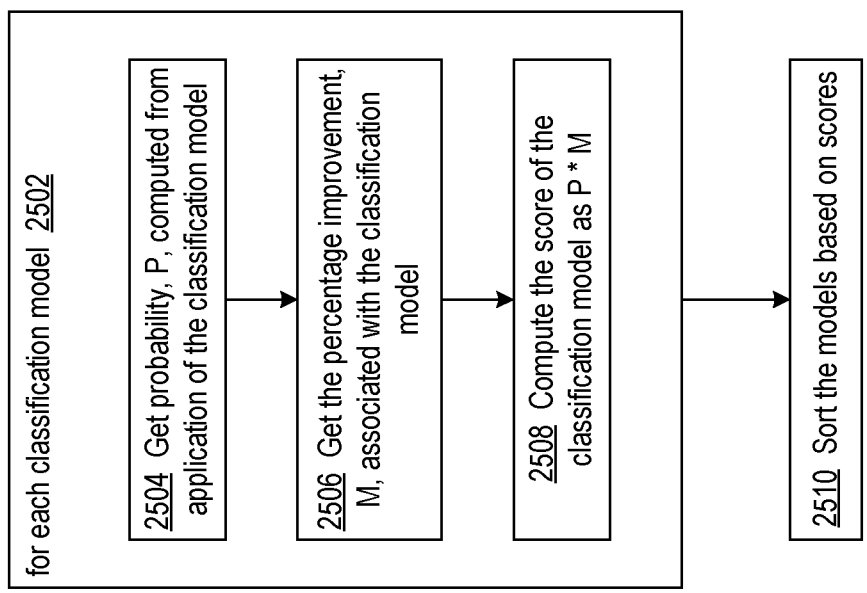
FIG. 15 shows a flowchart of a process that aggregates the outputs of the classification models.

FIG. 15 shows a flowchart of a process that aggregates the outputs of the classification models. The process generally determines scores of the classification models based on the probabilities that the strategies associated with the classification models would improve the target metric and the percentages of improvement associated with the classification models. As indicated above, for example, application of one classification model to a feature set can indicate the probability that application of the strategy would improve the circuit design having the feature set by at least 5% but less than 7%. The percentage improvement associated with that classification model for use in the aggregation can be a percentage, M, where 5% M≤7%.

The process of block 2502 is performed for each classification model. At block 2504, the design tool reads the probability, P, determined from the application of the classification model to the feature set of the current circuit design. The probability indicates the likelihood that application of the strategy associated with the classification model would improve the target metric of the circuit design by the associated percentage (or range).

At block 2506, the design tool reads the percentage improvement, M, associated with the classification model. The design tool at block 2508 computes a score of the classification model as a product of P and M (score=P*M).

Once the scores of the classification models have been computed, at block 2510 the design tool sorts the classification models by score. A greater score can indicate that the strategy associated with the classification model is better suited for improving the target metric than the strategy associated with a classification model having a lesser score.

Figure 16:
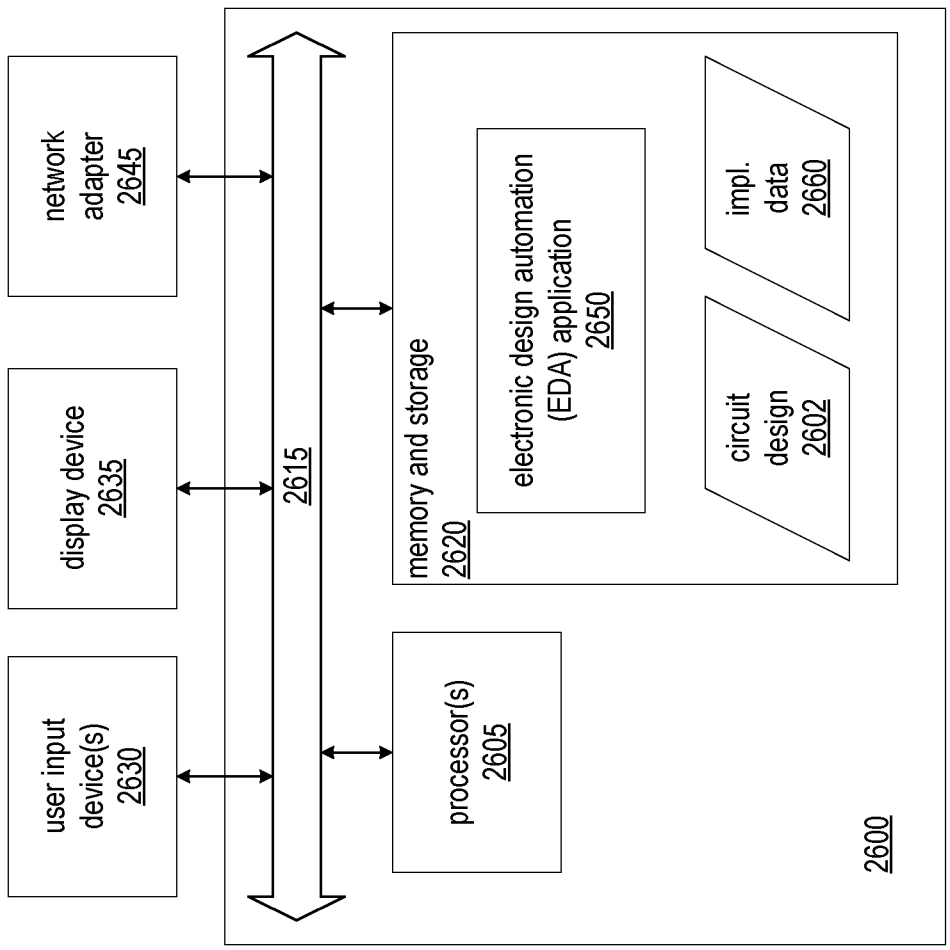
FIG. 16 is a block diagram illustrating an exemplary data processing system.

FIG. 16 is a block diagram illustrating an exemplary data processing system (system) 2600. System 2600 is an example of an EDA system. As pictured, system 2600 includes at least one processor circuit (or "processor"), e.g., a central processing unit (CPU) 2605 coupled to memory and storage arrangement 2620 through a system bus 2615 or other suitable circuitry. System 2600 stores program code and circuit design 2602 within memory and storage arrangement 2620.

Processor 2605 executes the program code accessed from the memory and storage arrangement 2620 via system bus 2615. In one aspect, system 2600 is implemented as a computer or other data processing system that is suitable for storing and/or executing program code. It should be appreciated, however, that system 2600 can be implemented in the form of any system including a processor and memory that is capable of performing the functions described within this disclosure.

Memory and storage arrangement 2620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 2600 may also include one or more cache memories (not shown) that provide temporary storage of at least some program code and data in order to reduce the number of times program code and data must be retrieved from local memory and persistent storage during execution.

Input/output (I/O) devices such as user input device(s) 2630 and a display device 2635 may be optionally coupled to system 2600. The I/O devices may be coupled to system 2600 either directly or through intervening I/O controllers. A network adapter 2645 also can be coupled to system 2600 in order to couple system 2600 to other systems, computer systems, remote printers, and/or remote storage devices through intervening private or public networks. Modems, cable modems, Ethernet cards, and wireless transceivers are examples of different types of network adapter 2645 that can be used with system 2600.

Memory and storage arrangement 2620 may store an EDA application 2650. EDA application 2650, being implemented in the form of executable program code, is executed by processor(s) 2605. As such, EDA application 2650 is considered part of system 2600. System 2600, while executing EDA application 2650, receives and operates on circuit design 2602. In one aspect, system 2600 performs the stabilization, exploration, and closure stages in processing the circuit design as described above. System 2600 generates data suitable for making an IC as implementation data 2660.

EDA application 2650, circuit design 2602, implementation data 2660, and any data items used, generated, and/or operated upon by EDA application 2650 are functional data structures that impart functionality when employed as part of system 2600 or when such elements, including derivations and/or modifications thereof, are loaded into an IC such as a programmable IC causing implementation and/or configuration of a circuit design within the programmable IC.

Some implementations are directed to a computer program product (e.g., nonvolatile memory device), which includes a machine or computer-readable medium having stored thereon instructions which may be executed by a computer (or other electronic device) to perform these operations/activities Though aspects and features may in some cases be described in individual figures, it will be appreciated that features from one figure can be combined with features of another figure even though the combination is not explicitly shown or explicitly described as a combination.

The methods and system are thought to be applicable to a variety of approaches for improving circuit designs. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of processing a circuit design, comprising:
   stabilizing the circuit design by a design tool by performing one or more iterations of implementation, optimization assessment, optimization, and stability assessment until a threshold stability level is achieved;
   determining, in response to satisfaction of the threshold stability level, a plurality of different strategies based on features of the circuit design and likelihood that use of the strategies would improve timing of the circuit design, wherein each strategy includes a set of parameter settings for the design tool;
   executing a plurality of implementation flows using the plurality of strategies to generate a plurality of alternative implementations;
   selecting one implementation of the plurality of alternative implementations nearest to satisfying a timing requirement;
   iteratively optimizing the one implementation to satisfy the timing requirement while restricting changes to placement of cells and nets on a critical path of the one implementation to less than a threshold portion of the cells and nets on the critical path; and
   processing the one implementation into data that is suitable for making an integrated circuit (IC).

2. The method of claim 1, wherein the stabilizing includes stabilizing based on optimizations of resource utilization, clocking, congestion, and timing.

3. The method of claim 1, wherein the stabilizing includes performing in order:

refining resource utilization;
optimizing distribution of clock signals;
reducing congestion; and
reducing signal delay on one or more critical paths.

4. The method of claim 1, wherein the iteratively optimizing includes:
assessing the one implementation for satisfaction of last mile criteria;
selecting modifications and making the modifications to a netlist of the one implementation in response to failure of the one implementation to satisfy the last mile criteria;
performing a limited set of placement, physical synthesis and router optimizations on the one implementation after making the modifications; and
bypassing the selecting modifications and making the modifications, and performing the limited set of placement, physical synthesis and router optimizations on the one implementation in response to the one implementation satisfying the last mile criteria.

5. The method of claim 4, wherein the performing the limited set of placement, physical synthesis and router optimizations on the one implementation includes unplacing selected cells in the one implementation.

6. The method of claim 1, wherein the iteratively optimizing includes:
attempting a first level of improvement in the worst negative slack in a first iteration of the iteratively optimizing;
attempting a second level of improvement in the worst negative slack in a second iteration of the iteratively optimizing; and
wherein the first level of improvement improves the worst negative slack to a first level that does not satisfy the timing requirement, and the second level of improvement improves the worst negative slack to a second level that is closer to satisfying the timing requirement than the first level.

7. The method of claim 1, wherein the iteratively optimizing includes restricting physical optimization of the one implementation to cells and nets affected by the modifications.

8. The method of claim 1, wherein the iteratively optimizing includes:
enabling first optimizations that improve routability; and
disabling second optimizations that impair routability.

9. The method of claim 1, wherein the determining the plurality of different strategies includes applying a plurality of classification models to the circuit design, wherein each classification model indicates one strategy of the plurality of strategies, and application of each classification model indicates a likelihood that use of the one strategy would improve a metric of the circuit design based on the features of the circuit design.

10. The method of claim 1, further comprising
making an IC according to the data.

11. A system, comprising:
a processor;
a memory arrangement coupled to the processor, wherein the memory arrangement is configured with instructions of a design tool for processing a circuit design, and in response to execution of the instructions, the processor performs operations including:
stabilizing the circuit design by performing one or more iterations of implementation, optimization assessment, optimization, and stability assessment until a threshold stability level is achieved;
determining, in response to satisfaction of the threshold stability level, a plurality of different strategies based on features of the circuit design and likelihood that use of the strategies would improve timing of the circuit design, wherein each strategy includes a set of parameter settings for the design tool;
executing a plurality of implementation flows using the plurality of strategies to generate a plurality of alternative implementations;
selecting one implementation of the plurality of alternative implementations nearest to satisfying a timing requirement; and
iteratively optimizing the one implementation to satisfy the timing requirement while restricting changes to placement of cells and nets on a critical path of the one implementation to fewer than a threshold portion of the cells and nets on the critical path; and
processing the one implementation into data that is suitable for making an integrated circuit (IC).

12. The system of claim 11, wherein the instructions for stabilizing include instructions that when executed by the processor cause the processor to stabilize the circuit design based on optimizations of resource utilization, clocking, congestion, and timing.

13. The system of claim 11, wherein the instructions for stabilizing include instructions that when executed by the processor cause the processor to perform in order:
refining resource utilization;
optimizing distribution of clock signals;
reducing congestion; and
reducing signal delay on one or more critical paths.

14. The system of claim 11, wherein the instructions for iteratively optimizing include instructions that when executed by the processor cause the processor to perform operations including:
assessing the one implementation for satisfaction of last mile criteria;
selecting modifications and making the modifications to a netlist of the one implementation in response to failure of the one implementation to satisfy the last mile criteria;
performing a limited set of placement, physical synthesis and router optimizations on the one implementation after making the modifications; and
bypassing the selecting modifications and making the modifications, and performing the limited set of placement, physical synthesis and router optimizations on the one implementation in response to the one implementation satisfying the last mile criteria.

15. The system of claim 14, wherein the instructions for performing the limited set of placement, physical synthesis and router optimizations on the one implementation include instructions that when executed by the processor cause the processor to unplace selected cells in the one implementation.

16. The system of claim 11, wherein the instructions for iteratively optimizing include instructions that when executed by the processor cause the processor to perform operations including:
attempting a first level of improvement in the worst negative slack in a first iteration of the iteratively optimizing;
attempting a second level of improvement in the worst negative slack in a second iteration of the iteratively optimizing; and
wherein the first level of improvement improves the worst negative slack to a first level that does not satisfy the timing requirement, and the second level of improvement improves the worst negative slack to a second level that is closer to satisfying the timing requirement than the first level.

17. The system of claim 11, wherein the instructions for iteratively optimizing include instructions that when executed by the processor cause the processor to restrict physical optimization of the one implementation to cells and nets affected by the modifications.

18. The system of claim 11, wherein the instructions for iteratively optimizing include instructions that when executed by the processor cause the processor to perform operations including:
 enabling first optimizations that improve routability; and
 disabling second optimizations that impair routability.

19. The system of claim 11, wherein the instructions for determining the plurality of different strategies include instructions that when executed by the processor cause the processor to apply a plurality of classification models to the circuit design, wherein each classification model indicates one strategy of the plurality of strategies, and application of each classification model indicates a likelihood that use of the one strategy would improve a metric of the circuit design based on the features of the circuit design.

20. The system of claim 11, wherein the memory arrangement is configured with additional instructions that when executed by the processor cause the processor to
 configure an IC with the data.

\* \* \* \* \*